(12) United States Patent
Si et al.

(10) Patent No.: US 11,696,142 B2
(45) Date of Patent: Jul. 4, 2023

(54) METHOD AND APPARATUS FOR RESOURCE MAPPING OF PDSCH ON UNLICENSED SPECTRUM

(71) Applicant: Samsung Electronics Co., Ltd., Suwon-si (KR)

(72) Inventors: Hongbo Si, Plano, TX (US); Yingzhe Li, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 296 days.

(21) Appl. No.: 16/792,786

(22) Filed: Feb. 17, 2020

(65) Prior Publication Data
US 2020/0322807 A1    Oct. 8, 2020

Related U.S. Application Data

(60) Provisional application No. 62/956,529, filed on Jan. 2, 2020, provisional application No. 62/936,037, filed
(Continued)

(51) Int. Cl.
H04W 72/04    (2023.01)
H04W 16/14    (2009.01)
(Continued)

(52) U.S. Cl.
CPC .......... *H04W 16/14* (2013.01); *H04L 1/1614* (2013.01); *H04W 56/001* (2013.01);
(Continued)

(58) Field of Classification Search
None
See application file for complete search history.

(56) References Cited

U.S. PATENT DOCUMENTS

2019/0068348 A1    2/2019  Nam
2019/0069256 A1    2/2019  Jung et al.
(Continued)

OTHER PUBLICATIONS

International Search Report and Written Opinion of the International Searching Authority in connection with International Application No. PCT/KR2020/004452 dated Jul. 6, 2020, 9 pages.
(Continued)

*Primary Examiner* — Willie J Daniel, Jr.

(57) ABSTRACT

A method and apparatus in a wireless communication system supporting shared spectrum channel access is provided. The method and apparatus comprises: receiving a set of downlink channels supporting the shared spectrum channel access; identifying, a window for SS/PBCH block transmission, a bitmap for SS/PBCH blocks (ssb-PositionsInBurst), and a parameter for QCL assumption Q; determining, based on the identified window for the SS/PBCH block transmission, the identified bitmap for the ssb-PositionsInBurst, and the identified parameter for the QCL assumption Q, a SS/PBCH block as one of: a first set of SS/PBCH blocks assumed to be transmitted by the BS, or a second set of SS/PBCH blocks not transmitted by the BS; determining a set of resources that is not available for at least one PDSCH as overlapped with the first set of SS/PBCH blocks; and receiving the at least one PDSCH based on resource other than the determined set of resources.

20 Claims, 15 Drawing Sheets

Related U.S. Application Data on Nov. 15, 2019, provisional application No. 62/870,301, filed on Jul. 3, 2019, provisional application No. 62/846,156, filed on May 10, 2019, provisional application No. 62/829,428, filed on Apr. 4, 2019.

(51) Int. Cl.

| | | |
|---|---|---|
| *H04W 56/00* | (2009.01) | |
| *H04W 88/10* | (2009.01) | |
| *H04L 1/1607* | (2023.01) | |
| *H04W 88/06* | (2009.01) | |
| *H04W 72/30* | (2023.01) | |

(52) U.S. Cl.
CPC ........... *H04W 72/30* (2023.01); *H04W 88/06* (2013.01); *H04W 88/10* (2013.01)

(56) References Cited

U.S. PATENT DOCUMENTS

| | | | |
|---|---|---|---|
| 2019/0081721 A1 | 3/2019 | Ly et al. | |
| 2021/0153189 A1* | 5/2021 | Jo | ............. H04W 72/0453 |

OTHER PUBLICATIONS

Ericsson, "Enhancements to initial access procedure," R1-1904336, 3GPP TSG-RAN WG1 Meeting #96b, Xi'an, China, Apr. 8-12, 2019, 13 pages.

Fujitsu, "Enhancements to initial access procedure and scheduling request procedure for NR-U," R1-1904588, 3GPP TSG RAN WG1 #96bis, Xi'an, China, Apr. 8-12, 2019, 7 pages.

Intel Corporation, "Correction to the description of subcarrierspacing usage in ServingCellConfigCommon," R2-1904459, 3GPP TSG-RAN WG2 Meeting #105bis, Xi'an, China, Apr. 8-12, 2019, 5 pages.

"3rd Generation Partnership Project; Technical Specification Group Radio Access Network; NR; Physical channels and modulation (Release 15)", 3GPP TS 38.211 V15.4.0, Dec. 2018, 96 pages.

"3rd Generation Partnership Project; Technical Specification Group Radio Access Network; NR; Multiplexing and channel coding (Release 15)", 3GPP TS 38.212 V15.4 0, Dec. 2018, 100 pages.

"3rd Generation Partnership Project; Technical Specification Group Radio Access Network; NR; Physical layer procedures for control (Release 15)" 3GPP TS 38.213 V15.4.0, Dec. 2018, 104 pages.

"3rd Generation Partnership Project; Technical Specification Group Radio Access Network; NR; Physical layer procedures for data (Release 15)", 3GPP TS 38.214 V15.4.0, Dec. 2018, 102 pages.

"3rd Generation Partnership Project; Technical Specification Group Radio Access Network; NR; Physical layer measurements (Release 15)", 3GPP TS 38.215 V15.4.0, Dec. 2018, 15 pages.

"3rd Generation Partnership Project; Technical Specification Group Radio Access Network; NR; Radio Resource Control (RRC) protocol specification (Release 15)", 3GPP TS 38.331 V15.4.0, Dec. 2018, 474 pages.

Qualcomm Incorporated, "Remaining Issues on DL/UL Resource Allocation", 3GPP TSG-RAN WG1 Meeting #93, May 21-25, 2018, R1-1807363, 14 pages.

Supplementary European Search Report dated Mar. 25, 2022 in connection with European Patent Application No. 20 78 5134, 10 pages.

\* cited by examiner

METHOD AND APPARATUS FOR RESOURCE MAPPING OF PDSCH ON UNLICENSED SPECTRUM

CROSS-REFERENCE TO RELATED APPLICATIONS AND CLAIM OF PRIORITY

The present application claims priority to U.S. Provisional Patent Application No. 62/829,428, filed on Apr. 4, 2019; U.S. Provisional Patent Application No. 62/846,156, filed on May 10, 2019; U.S. Provisional Patent Application No. 62/870,301, filed on Jul. 3, 2019; U.S. Provisional Patent Application No. 62/936,037, filed on Nov. 15, 2019; and U.S. Provisional Patent Application No. 62/956,529, filed on Jan. 2, 2020. The content of the above-identified patent document is incorporated herein by reference.

TECHNICAL FIELD

The present application relates generally to wireless communication systems, more specifically, the present disclosure relates to resource mapping of PDSCH on unlicensed spectrum.

BACKGROUND

A communication system includes a downlink (DL) that conveys signals from transmission points such as base stations (BSs) or NodeBs to user equipments (UEs) and an uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB (eNB), referring to a NodeB in long-term evolution (LTE) communication system, and a gNodeB (gNB), referring to a NodeB in new radio (NR) communication system, may also be referred to as an access point or other equivalent terminology.

SUMMARY

The present disclosure relates to a pre-5G or 5G communication system to be provided for resource mapping of PDSCH on unlicensed spectrum.

In one embodiment, a user equipment (UE) in a wireless communication system supporting shared spectrum channel access is provided. The UE comprises at least one transceiver configured to receive, from a base station (BS), a set of downlink channels supporting the shared spectrum channel access. The UE further comprises at least one processor operably connected to the at least one transceiver, the at least one processor configured to: identify, from the set of downlink channels, a window for synchronization signal/physical broadcast channel (SS/PBCH) block transmission, a bitmap for SS/PBCH blocks (ssb-PositionsInBurst), and a parameter for quasi-co-location (QCL) assumption Q, determine, based on the identified window for the SS/PBCH block transmission, the identified bitmap for the ssb-PositionsIn-Burst, and the identified parameter for the QCL assumption Q, a SS/PBCH block in the identified window for the SS/PBCH block transmission as one of: a first set of SS/PBCH blocks assumed to be transmitted by the BS, or a second set of SS/PBCH blocks not transmitted by the BS, and determine a set of resources that is not available for at least one physical downlink shared channel (PDSCH) as overlapped with the first set of SS/PBCH blocks. The at least one transceiver of the UE is further configured to receive, from the BS, the at least one PDSCH based on resources other than the determined set of resources.

In another embodiment, a base station (BS) in a wireless communication system supporting shared spectrum channel access is provided. The BS comprises at least one processor configured to determine a window for synchronize signal/physical broadcast channel (SS/PBCH) block transmission, a bitmap for SS/PBCH blocks (ssb-PositionsInBurst), and a parameter for quasi-co-location (QCL) assumption Q. The BS further comprises at least one transceiver operably connected to the at least one processor, the at least one transceiver configured to transmit, to a user equipment (UE), a set of downlink channels including the window for the SS/PBCH block transmission, the bitmap for ssb-PositionsInBurst, and the parameter for QCL assumption Q, wherein the at least one processor is further configured to: indicate, to the UE, a SS/PBCH block, based on the window for the SS/PBCH block transmission, the bitmap for ssb-PositionsInBurst, and the parameter for QCL assumption Q, the SS/PBCH block that is identified in the window for the SS/PBCH block transmission being determined, at the UE, as one of: a first set of SS/PBCH blocks assumed to be transmitted by the BS, or a second set of SS/PBCH blocks assumed to be transmitted by the BS, and determine a set of resources that is not available for at least one physical downlink shared channel (PDSCH) as overlapped with the first set of SS/PBCH blocks. The at least one transceiver of the BS is further configured to transmit, to the UE, the at least one PDSCH using other resources than the determined set of resources.

In yet another embodiment, a method of a user equipment (UE) in a wireless communication system supporting shared spectrum channel access is provided. The method comprises: receiving, from a base station (BS), a set of downlink channels supporting the shared spectrum channel access; identifying, from the set of downlink channels, a window for synchronization signal/physical broadcast channel (SS/PBCH) block transmission, a bitmap for SS/PBCH blocks (ssb-PositionsInBurst), and a parameter for quasi-co-location (QCL) assumption Q; determining, based on the identified window for the SS/PBCH block transmission, the identified bitmap for the ssb-PositionsInBurst, and the identified parameter for the QCL assumption Q, a SS/PBCH block in the identified window for the SS/PBCH block transmission as one of: a first set of SS/PBCH blocks assumed to be transmitted by the BS, or a second set of SS/PBCH blocks not transmitted by the BS; determining a set of resources that is not available for at least one physical downlink shared channel (PDSCH) as overlapped with the first set of SS/PBCH blocks; and receiving, from the BS, the at least one PDSCH based on resource other than the determined set of resources.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v15.4.0, "NR; Physical channels and modulation;" 3GPP TS 38.212 v15.4.0, "NR; Multiplexing and Channel coding;" 3GPP TS 38.213 v15.4.0, "NR; Physical Layer Procedures for Control;" 3GPP TS 38.214 v15.4.0, "NR; Physical Layer Procedures for Data;" 3GPP TS 38.215 v15.4.0, "NR; Physical Layer Measurements;" and 3GPP TS 38.331 v15.4.0, "NR; Radio Resource Control (RRC) Protocol Specification."

Figure 1:
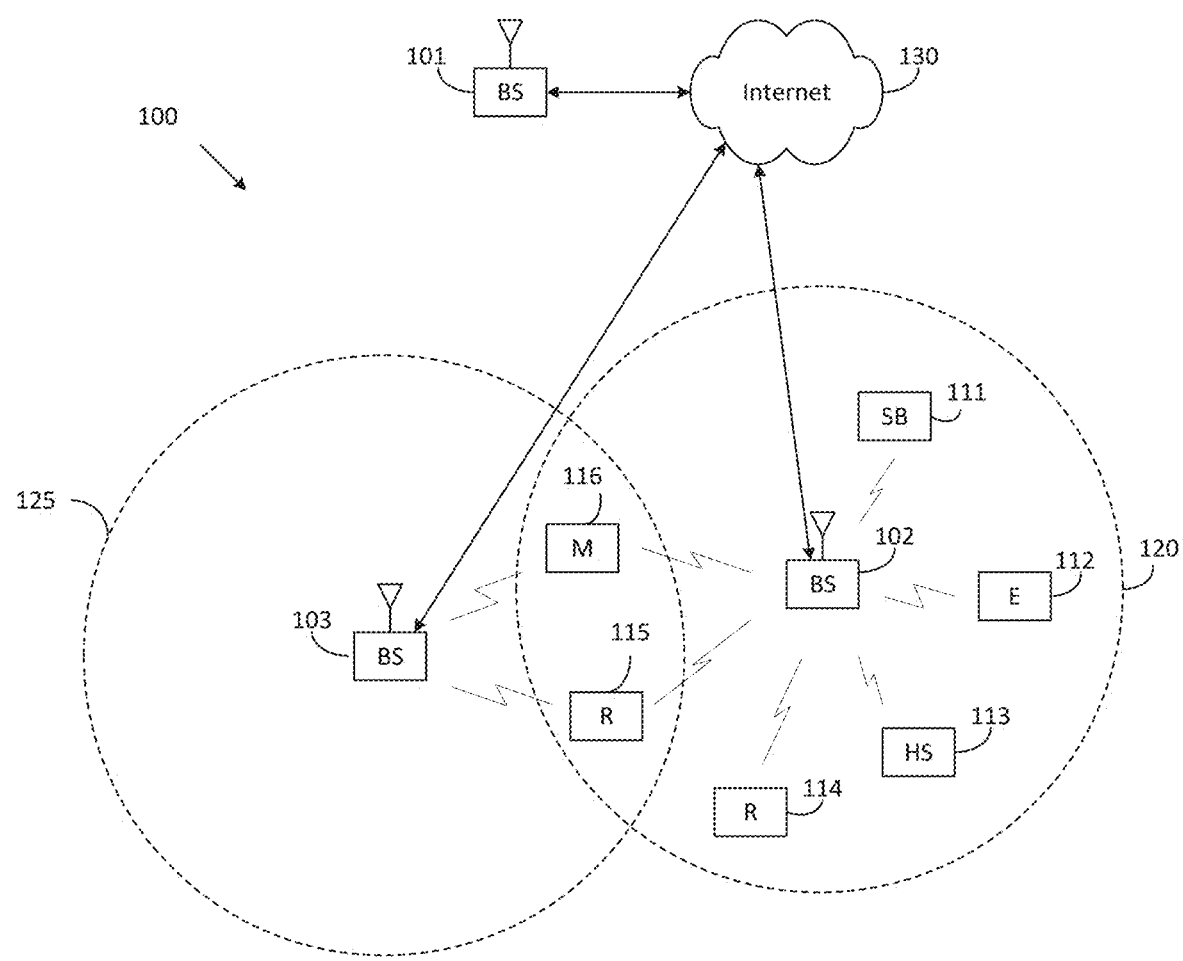
FIG. 1 illustrates an example wireless network according to embodiments of the present disclosure.
Figure 2:
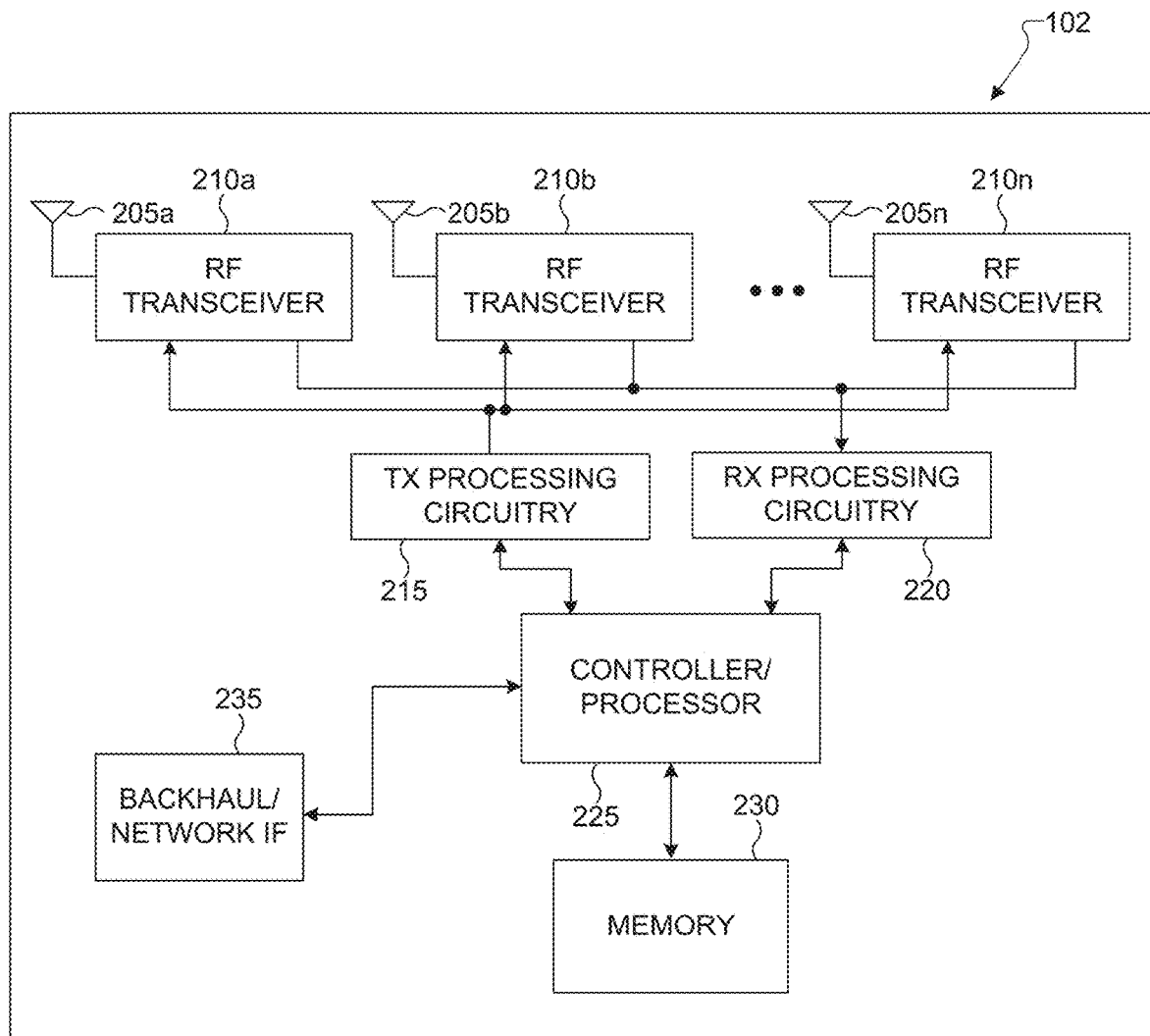
FIG. 2 illustrates an example gNB according to embodiments of the present disclosure.
Figure 3:
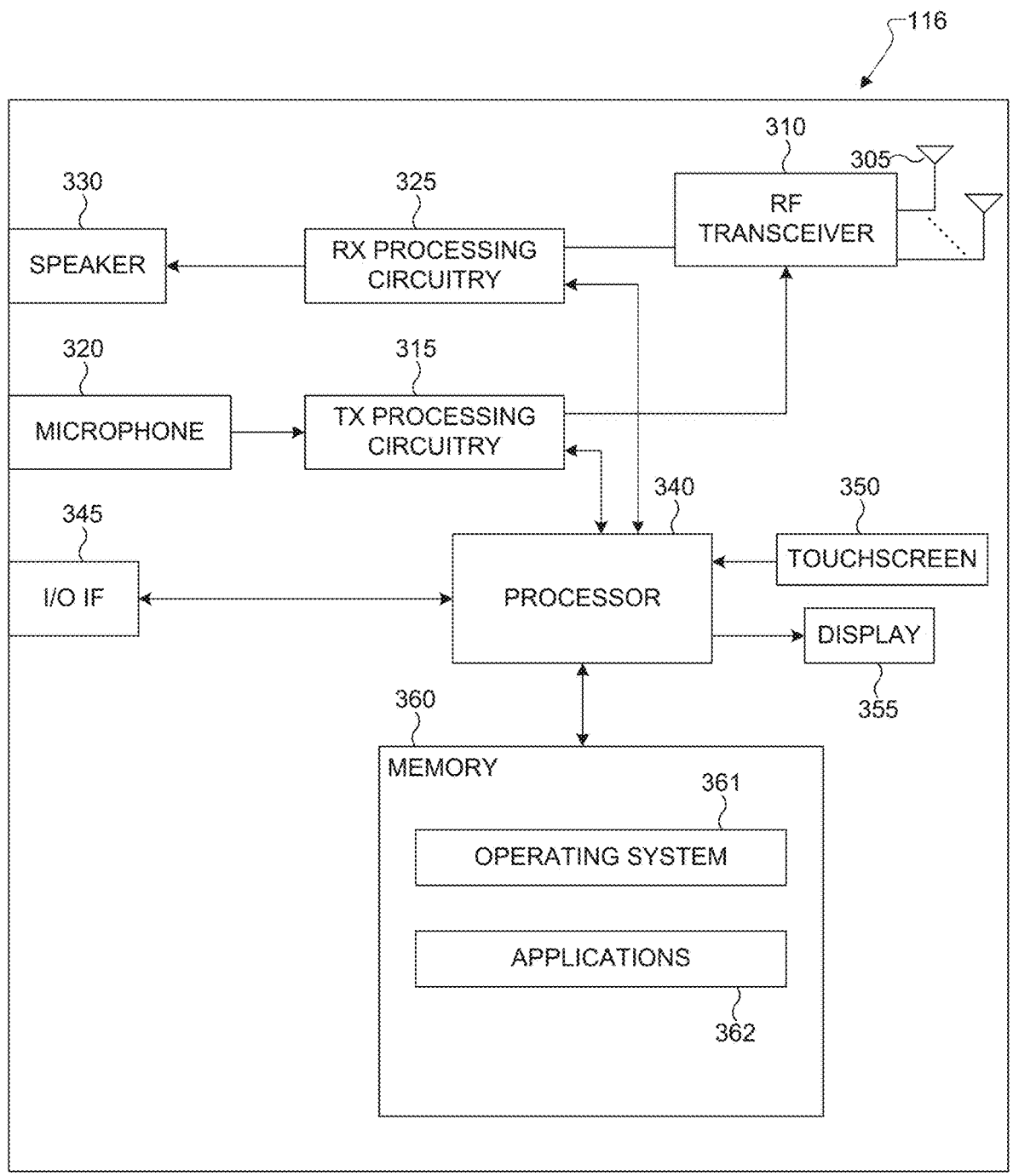
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for reception reliability for data and control information in an advanced wireless communication system. In certain embodiments, and one or more of the gNBs 101-103 includes circuitry, programing, or a combination thereof, for efficient resource mapping of PDSCH in DRS on unlicensed spectrum.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of the gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of the UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

The present disclosure relates generally to wireless communication systems and, more specifically, to reducing power consumption for a user equipment (UE) communicating with a base station and to transmissions to and receptions from a UE of physical downlink control channels (PDCCHs) for operation with dual connectivity. A communication system includes a downlink (DL) that refers to transmissions from a base station or one or more transmission points to UEs and an uplink (UL) that refers to transmissions from UEs to a base station or to one or more reception points.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system." The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can include 14 symbols, have duration of 1 millisecond or 0.5 milliseconds, and an RB can have a BW of 180 kHz or 360 kHz and include 12 SCs with inter-SC spacing of 15 kHz or 30 kHz, respectively.

DL signals include data signals conveying information content, control signals conveying DL control information (DCI) formats, and reference signals (RS) that are also known as pilot signals. A gNB can transmit data information (e.g., transport blocks) or DCI formats through respective physical DL shared channels (PDSCHs) or physical DL control channels (PDCCHs). A gNB can transmit one or more of multiple types of RS including channel state information RS (CSI-RS) and demodulation RS (DMRS). A CSI-RS is intended for UEs to measure channel state information (CSI) or to perform other measurements such as ones related to mobility support. A DMRS can be transmitted only in the BW of a respective PDCCH or PDSCH and a UE can use the DMRS to demodulate data or control information.

UL signals also include data signals conveying information content, control signals conveying UL control information (UCI), and RS. A UE transmits data information (e.g., transport blocks) or UCI through a respective physical UL shared channel (PUSCH) or a physical UL control channel (PUCCH). When a UE simultaneously transmits data information and UCI, the UE can multiplex both in a PUSCH or transmit them separately in respective PUSCH and PUCCH. UCI includes hybrid automatic repeat request acknowledgement (HARQ-ACK) information, indicating correct or incorrect detection of data transport blocks (TBs) by a UE, scheduling request (SR) indicating whether a UE has data in the UE's buffer, and CSI reports enabling a gNB to select appropriate parameters to perform link adaptation for PDSCH or PDCCH transmissions to a UE.

A CSI report from a UE can include a channel quality indicator (CQI) informing a gNB of a modulation and coding scheme (MCS) for the UE to detect a data TB with a predetermined block error rate (BLER), such as a 10% BLER, of a precoding matrix indicator (PMI) informing a gNB how to precode signaling to a UE, and of a rank indicator (RI) indicating a transmission rank for a PDSCH. UL RS includes DMRS and sounding RS (SRS). DMRS is transmitted only in a BW of a respective PUSCH or PUCCH transmission. A gNB can use a DMRS to demodulate information in a respective PUSCH or PUCCH. SRS is transmitted by a UE to provide a gNB with UL CSI and, for a TDD or a flexible duplex system, to also provide a PMI for DL transmissions. An UL DMRS or SRS transmission can be based, for example, on a transmission of a Zadoff-Chu (ZC) sequence or, in general, of a CAZAC sequence.

DL transmissions and UL transmissions can be based on an orthogonal frequency division multiplexing (OFDM) waveform including a variant using DFT precoding that is known as DFT-spread-OFDM.

Figure 4:
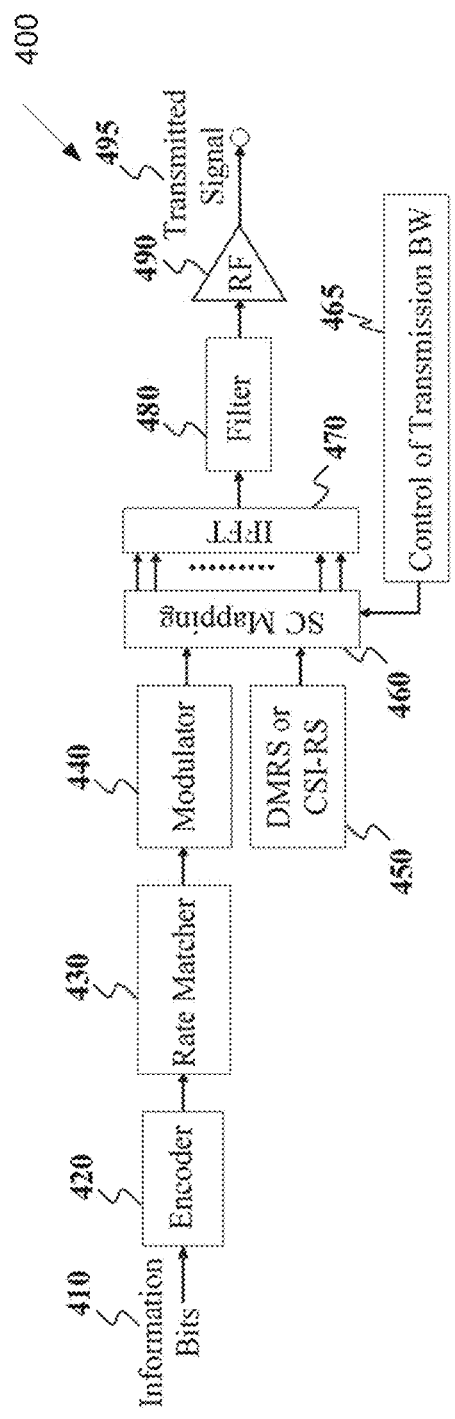
FIG. 4 illustrates an example transmitter structure using OFDM according to embodiments of the present disclosure.

FIG. 4 illustrates an example transmitter structure 400 using OFDM according to embodiments of the present disclosure. An embodiment of the transmitter structure 400 shown in FIG. 4 is for illustration only. One or more of the components illustrated in FIG. 4 can be implemented in specialized circuitry configured to perform the noted functions or one or more of the components can be implemented by one or more processors executing instructions to perform the noted functions. Other embodiments are used without departing from the scope of the present disclosure.

Information bits, such as DCI bits or data bits 410, are encoded by encoder 420, rate matched to assigned time/frequency resources by rate matcher 430 and modulated by modulator 440. Subsequently, modulated encoded symbols and DMRS or CSI-RS 450 are mapped to SCs 460 by SC mapping unit 465, an inverse fast Fourier transform (IFFT) is performed by filter 470, a cyclic prefix (CP) is added by CP insertion unit 480, and a resulting signal is filtered by filter 490 and transmitted by an radio frequency (RF) unit 495.

Figure 5:
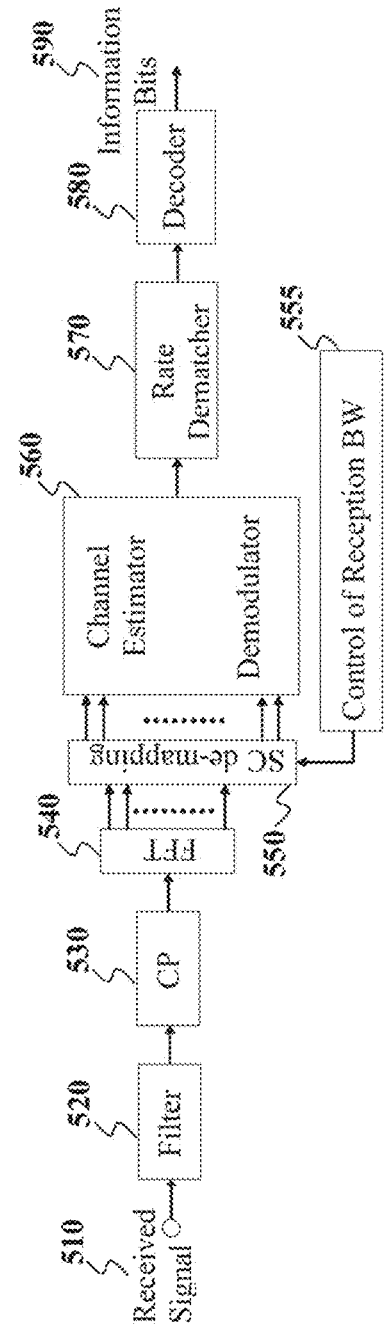
FIG. 5 illustrates an example receiver structure using OFDM according to embodiments of the present disclosure.

FIG. 5 illustrates an example receiver structure 500 using OFDM according to embodiments of the present disclosure. An embodiment of the receiver structure 500 shown in FIG. 5 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

A received signal 510 is filtered by filter 520, a CP removal unit removes a CP 530, a filter 540 applies a fast Fourier transform (FFT), SCs de-mapping unit 550 de-maps SCs selected by BW selector unit 555, received symbols are demodulated by a channel estimator and a demodulator unit 560, a rate de-matcher 570 restores a rate matching, and a decoder 580 decodes the resulting bits to provide information bits 590.

A UE typically monitors multiple candidate locations for respective potential PDCCH transmissions to decode multiple candidate DCI formats in a slot. Monitoring a PDCCH candidates means receiving and decoding the PDCCH candidate according to DCI formats the UE is configured to receive. A DCI format includes cyclic redundancy check (CRC) bits in order for the UE to confirm a correct detection of the DCI format. A DCI format type is identified by a radio network temporary identifier (RNTI) that scrambles the CRC bits. For a DCI format scheduling a PDSCH or a PUSCH to a single UE, the RNTI can be a cell RNTI (C-RNTI) and serves as a UE identifier.

For a DCI format scheduling a PDSCH conveying system information (SI), the RNTI can be an SI-RNTI. For a DCI format scheduling a PDSCH providing a random-access response (RAR), the RNTI can be an RA-RNTI. For a DCI format scheduling a PDSCH or a PUSCH to a single UE prior to a UE establishing a radio resource control (RRC)

connection with a serving gNB, the RNTI can be a temporary C-RNTI (TC-RNTI). For a DCI format providing TPC commands to a group of UEs, the RNTI can be a TPC-PUSCH-RNTI or a TPC-PUCCH-RNTI. Each RNTI type can be configured to a UE through higher layer signaling such as RRC signaling. A DCI format scheduling PDSCH transmission to a UE is also referred to as DL DCI format or DL assignment while a DCI format scheduling PUSCH transmission from a UE is also referred to as UL DCI format or UL grant.

A PDCCH transmission can be within a set of physical RBs (PRBs). A gNB can configure a UE one or more sets of PRBs, also referred to as control resource sets, for PDCCH receptions. A PDCCH transmission can be in control channel elements (CCEs) that are included in a control resource set. A UE determines CCEs for a PDCCH reception based on a search space such as a UE-specific search space (USS) for PDCCH candidates with DCI format having CRC scrambled by a RNTI, such as a C-RNTI, that is configured to the UE by UE-specific RRC signaling for scheduling PDSCH reception or PUSCH transmission, and a common search space (CSS) for PDCCH candidates with DCI formats having CRC scrambled by other RNTIs. A set of CCEs that can be used for PDCCH transmission to a UE define a PDCCH candidate location. A property of a control resource set is transmission configuration indication (TCI) state that provides quasi co-location information of the DMRS antenna port for PDCCH reception.

Figure 6:
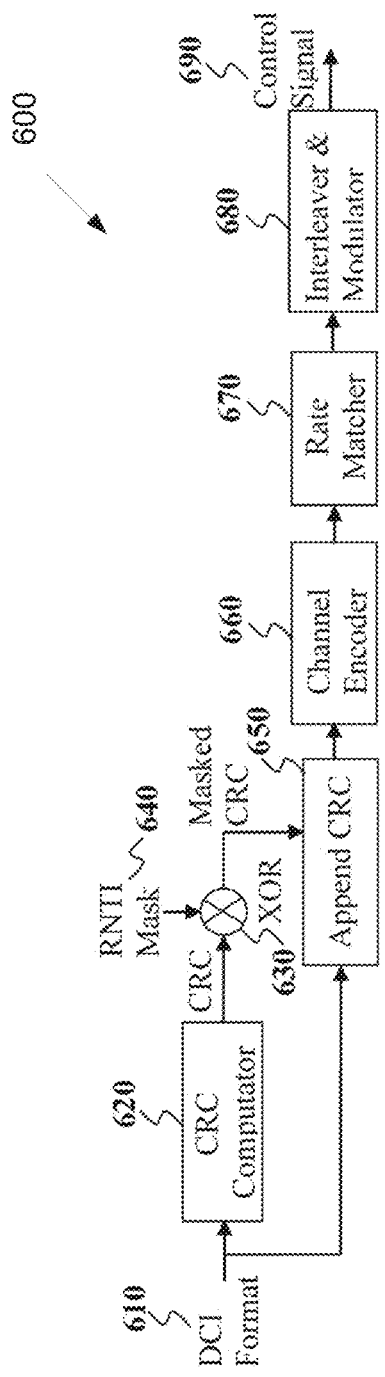
FIG. 6 illustrates an example encoding process for a DCI format according to embodiments of the present disclosure.

FIG. 6 illustrates an example encoding process 600 for a DCI format according to embodiments of the present disclosure. An embodiment of the encoding process 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

A gNB separately encodes and transmits each DCI format in a respective PDCCH. A RNTI masks a CRC of the DCI format codeword in order to enable the UE to identify the DCI format. For example, the CRC and the RNTI can include, for example, 16 bits or 24 bits. The CRC of (non-coded) DCI format bits 610 is determined using a CRC computation unit 620, and the CRC is masked using an exclusive OR (XOR) operation unit 630 between CRC bits and RNTI bits 640. The XOR operation is defined as XOR (0, 0)=0, XOR (0, 1)=1, XOR (1, 0)=1, XOR (1, 1)=0. The masked CRC bits are appended to DCI format information bits using a CRC append unit 650. An encoder 660 performs channel coding (such as tail-biting convolutional coding or polar coding), followed by rate matching to allocated resources by rate matcher 670. Interleaving and modulation units 680 apply interleaving and modulation, such as QPSK, and the output control signal 690 is transmitted.

Figure 7:
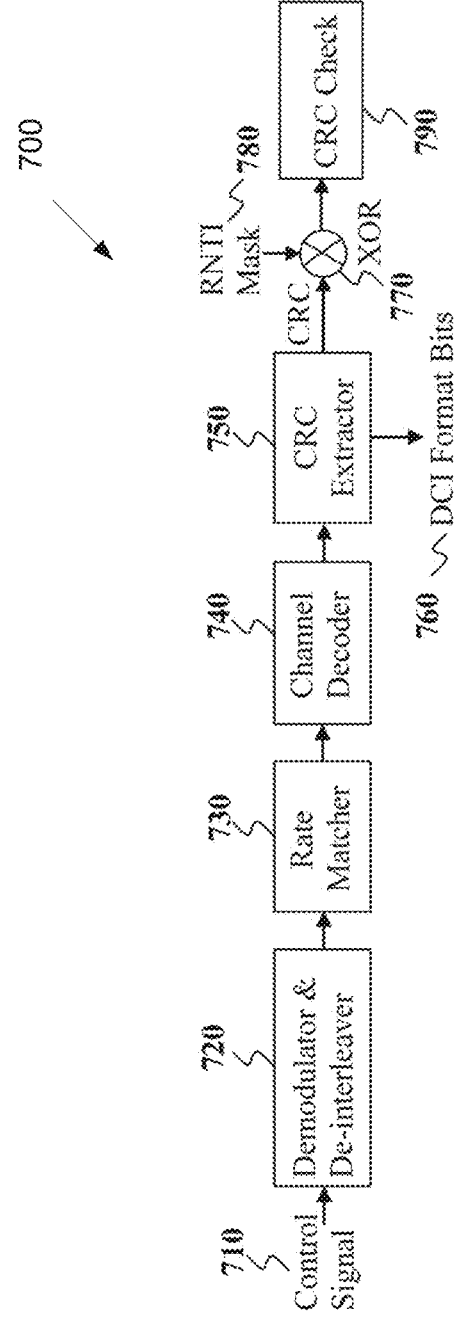
FIG. 7 illustrates an example decoding process for a DCI format for use with a UE according to embodiments of the present disclosure.

FIG. 7 illustrates an example decoding process 700 for a DCI format for use with a UE according to embodiments of the present disclosure. An embodiment of the decoding process 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

A received control signal 710 is demodulated and de-interleaved by a demodulator and a de-interleaver 720. A rate matching applied at a gNB transmitter is restored by rate matcher 730, and resulting bits are decoded by decoder 740. After decoding, a CRC extractor 750 extracts CRC bits and provides DCI format information bits 760. The DCI format information bits are de-masked 770 by an XOR operation with an RNTI 780 (when applicable) and a CRC check is performed by unit 790. When the CRC check succeeds (checksum is zero), the DCI format information bits are considered to be valid. When the CRC check does not succeed, the DCI format information bits are considered to be invalid.

The federal communications commission defined unlicensed carriers to provide cost-free public access spectrum. Use of unlicensed carriers by a UE is allowed only under the provisions that the UE does not generate noticeable interference to communications in licensed carriers and that communications in unlicensed carriers are not protected from interference. For example, unlicensed carriers include the industrial, scientific and medical carriers and the Unlicensed National Information Infrastructure carriers that can be used by IEEE 802.11 devices. It may be possible to deploy LTE radio access technology (RAT) on an unlicensed frequency spectrum, which is also known as LTE-Unlicensed or LTE-U or licensed assisted access (LAA).

The present disclosure focuses on the design of PDSCH resource mapping on the unlicensed spectrum, wherein the PDSCH includes PDSCH within DRS and DRS contains SS/PBCH block(s), and configurable CORESET(s) and PDSCH(s) of RMSI, OSI, or paging, as well as configurable channel state indicator reference signal (CSI-RS), which can be considered as enhancement to discovery signals in LTE for initial cell acquisition purpose as well. The terminology of DRS can also be referred to other equivalent terminologies, such as discovery burst, discovery reference signal and channel, discovery block, discovery signals, discovery signals and channels (DSCH), discovery burst (DB), and so on. The transmission window for DRS can also refer to the transmission window for components in the DRS (e.g., the transmission window of SS/PBCH blocks).

Since DRS contains both SS/PBCH block(s) and configured PDSCH of RMSI/OSI/paging, there is a need to define UE behavior on rate matching of the PDSCH of RMSI/OSI/paging around SS/PBCH block(s). In order to properly define the rate matching behavior, there could be a need of indication on the existence of SS/PBCH block(s) within the slot for rate matching purpose.

Meanwhile, DRS is a compact unit in time domain, such that components within the DRS could use the same LBT to initialize the transmission. Hence, there is a need to enhance the resource mapping configuration to achieve the compact unit in time domain.

Figure 8:
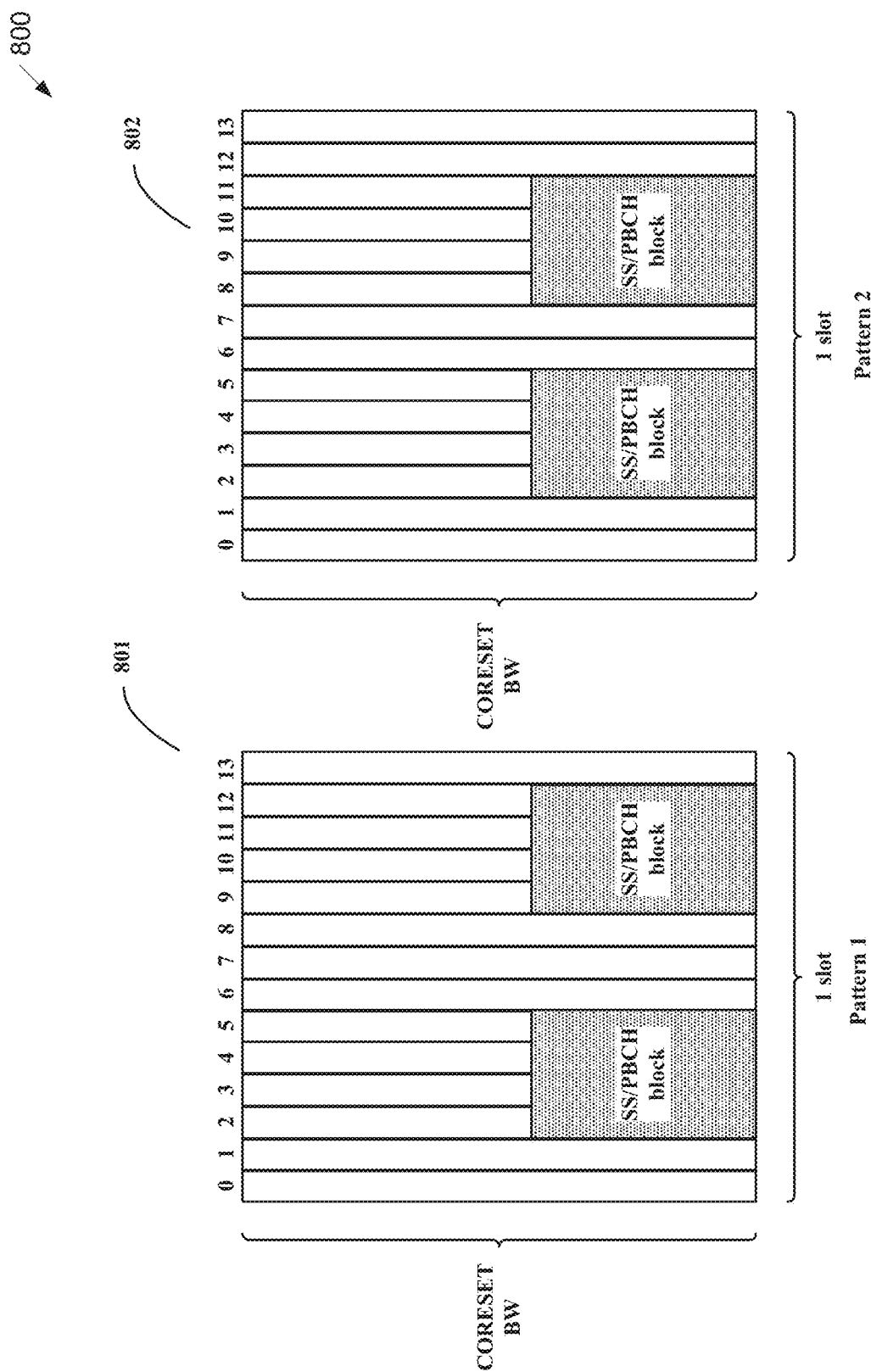
FIG. 8 illustrates an example SS/PBCH block patterns within a slot according to embodiments of the present disclosure.

FIG. 8 illustrates an example SS/PBCH block patterns within a slot 800 according to embodiments of the present disclosure. An embodiment of the SS/PBCH block patterns within a slot 800 shown in FIG. 8 is for illustration only. FIG. 7 does not limit a scope of the present disclosure.

FIG. 8 illustrates two SS/PBCH block patterns within a slot, wherein pattern 1 801 has two possible SS/PBCH blocks locations as symbol #{2, 3, 4, 5} and #{9, 10, 11, 12}, correspondingly, and pattern 2 802 has two possible SS/PBCH blocks locations as symbol #{2, 3, 4, 5} and #{8, 9, 10, 11}, correspondingly.

In the present disclosure, the physical downlink shared channel (PDSCH) can refer to the PDSCH within DRS, which is scheduled by at least one of Type0-PDCCH (e.g., RMSI), Type0A-PDCCH (e.g., OSI), or Type2-PDCCH (e.g., paging).). In the present disclosure, the physical downlink shared channel (PDSCH) can also refer to the PDSCH scheduled by a UE-specific PDCCH.

The time domain resource mapping of PDSCH is denoted as the start and length indicator SLIV, wherein SLIV is determined by a starting indicator S and a length indicator L as follows: if $(L-1)\leq 7$, then SLIV=14*(L-1)+S; else, SLIV=14*(14-L+1)+(14-S-1), wherein $0 < L \leq 14-S$.

In one embodiment, PDSCH is assumed to be within same slot as the associated PDCCH, and K_0=0.

In another embodiment, if single CORESET is configured within a slot, and the CSS starts from symbol #0, at least the time-domain configuration of resource mapping of PDSCH can contain a configuration starting from in the middle of the slot (e.g., symbol #7 or #8) and ending no earlier than the last symbol of 2nd SS/PBCH block (e.g., symbol #12 or #13).

In yet another embodiment, UE determines the time-domain configuration of resource mapping of PDSCH depending on the location of the received SS/PBCH block in the slot. For example, UE determines the starting symbol as S if the received SS/PBCH block is the first SS/PBCH block located in the slot, and determines the starting symbol as S+X if the received SS/PBCH block is the second SS/PBCH block located in the slot, wherein in one instance X is fixed (e.g., X=7 in SS/PBCH block Pattern 1, or X=6 in SS/PBCH block Pattern 2), and in another instance X is determined by the configuration of CORESET and/or CSS.

In yet another embodiment, UE determines the time-domain configuration of resource mapping of PDSCH depending on the configuration of CORESET and/or CSS. For example, there can be a PDSCH time-domain resource allocation table for each configuration of CORESET and/or CSS.

In yet another embodiment, there is at least one configuration such that PDSCH is not mapped to the last symbol (e.g., #13), if single CSS is configured, or both CSSs are configured at the starting of a slot if two CSSs are configured.

In yet another embodiment, there is at least one configuration such that PDSCH is not mapped to symbol #6 and symbol #13, if two CSSs are configured with starting symbol as #0 and #7, correspondingly.

In yet another embodiment, the UE determines the PDSCH mapping type based on the configuration of CORESET and/or CSS.

If the SS/PBCH block pattern is Pattern 1, as illustrated in FIG. 8 (e.g., 801), the following examples or part of the following examples (e.g., TABLES 1-1 to 1-5) could be supported.

Figure 9:
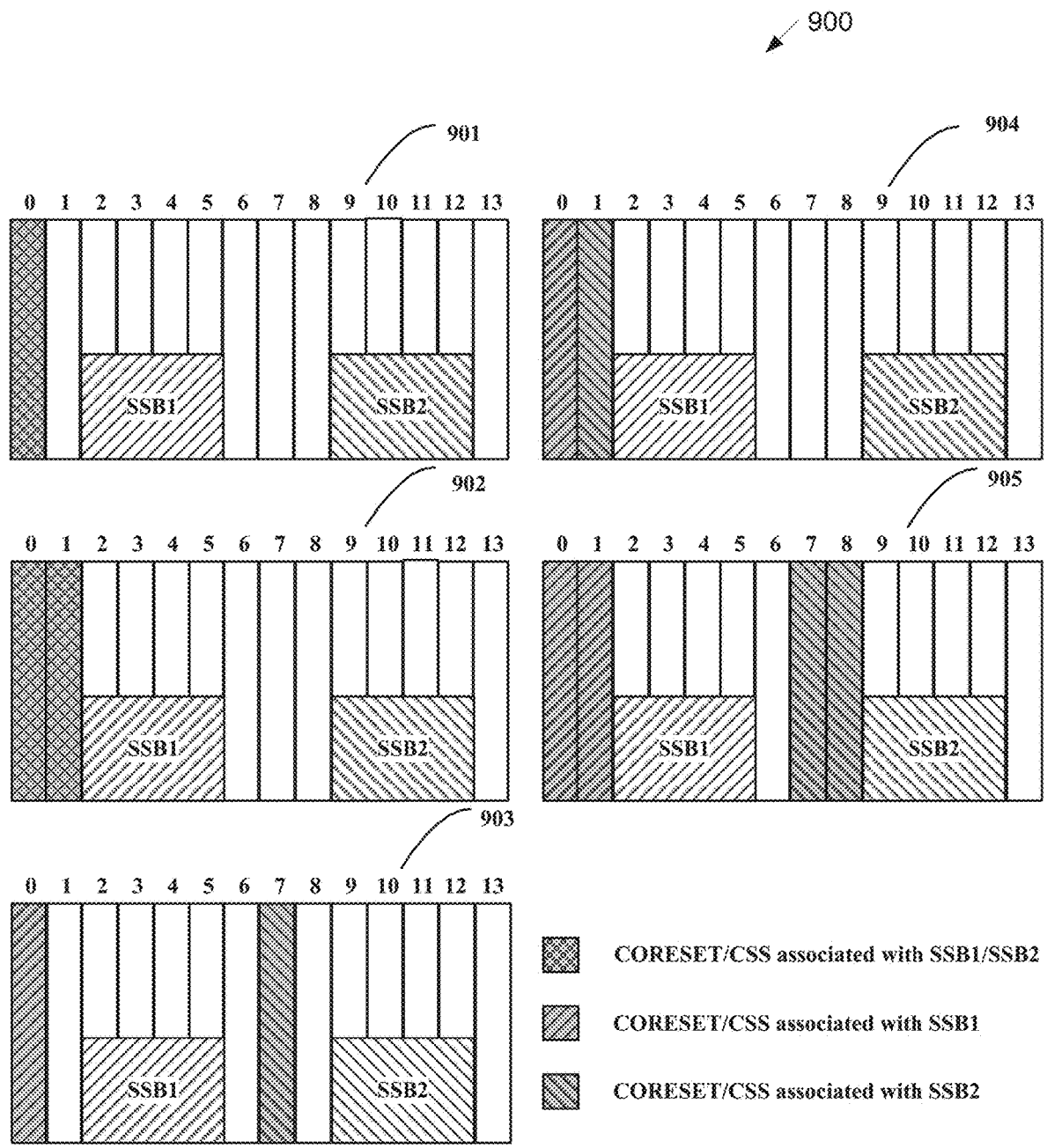
FIG. 9 illustrates an example configuration of CORESET/CSS for SSB Pattern 1 according to embodiments of the present disclosure.

FIG. 9 illustrates an example configuration of CORESET/CSS for SSB pattern 1 900 according to embodiments of the present disclosure. An embodiment of the configuration of CORESET/CSS for SSB pattern 1 900 shown in FIG. 9 is for illustration only. FIG. 9 does not limit a scope of the present disclosure.

When the number of symbols for CORESET is configured as 1, and 1 common search space (CSS) is configured within the CORESET and starting from symbol #0 (e.g., 201 as illustrated in FIG. 9), PDSCH time domain resource allocation may support at least one of the following configurations as in TABLE 1-1:

TABLE 1-1

Examples of PDSCH time-domain resource mapping configuration

| Index | PDSCH mapping type | K_0 | S | L |
|---|---|---|---|---|
| 1 | Type A | 0 | 1 | 5 |
| 2 | Type A | 0 | 8 | 5 |
| 3 | Type A | 0 | 1 | 6 |
| 4 | Type A | 0 | 8 | 6 |
| 5 | Type A | 0 | 1 | 12 |
| 6 | Type A | 0 | 1 | 13 |

When the number of symbols for CORESET is configured as 2, and 1 CSS is configured within the CORESET and starting from symbol #0 (e.g., 902 as illustrated in FIG. 9), PDSCH time domain resource allocation may support at least one of the following configurations as in TABLE 1-2.

TABLE 1-2

Examples of PDSCH time-domain resource mapping configuration

| Index | PDSCH mapping type | K_0 | S | L |
|---|---|---|---|---|
| 1 | Type A | 0 | 2 | 4 |
| 2 | Type A | 0 | 9 | 4 |
| 3 | Type A | 0 | 2 | 5 |
| 4 | Type A | 0 | 9 | 5 |
| 5 | Type A | 0 | 2 | 11 |
| 6 | Type A | 0 | 2 | 12 |

When the number of symbols for CORESET is configured as 1, and 2 CSSs are configured within the CORESET and starting from symbol #0 and #7, correspondingly (e.g., 903 as illustrated in FIG. 9), PDSCH time domain resource allocation may support at least one of the following configurations as in TABLE 1-3.

TABLE 1-3

Examples of PDSCH time-domain resource mapping configuration

| Index | PDSCH mapping type | K_0 | S | L |
|---|---|---|---|---|
| 1 | Type A | 0 | 1 | 5 |
| 2 | Type A | 0 | 1 | 6 |
| 3 | Type B | 0 | 8 | 5 |
| 4 | Type B | 0 | 8 | 6 |

When the number of symbols for CORESET is configured as 1, and 2 CSSs are configured within the CORESET and starting from symbol #0 and #1, correspondingly (e.g., 904 as illustrated in FIG. 9), PDSCH time domain resource allocation may support at least one of the following configurations as in TABLE 1-4.

TABLE 1-4

Examples of PDSCH time-domain resource mapping configuration

| Index | PDSCH mapping type | K_0 | S | L |
|---|---|---|---|---|
| 1 | Type A | 0 | 2 | 4 |
| 2 | Type B | 0 | 9 | 4 |
| 3 | Type A | 0 | 2 | 5 |
| 4 | Type B | 0 | 9 | 5 |
| 5 | Type A | 0 | 2 | 6 |
| 6 | Type B | 0 | 8 | 6 |

Figure 10:
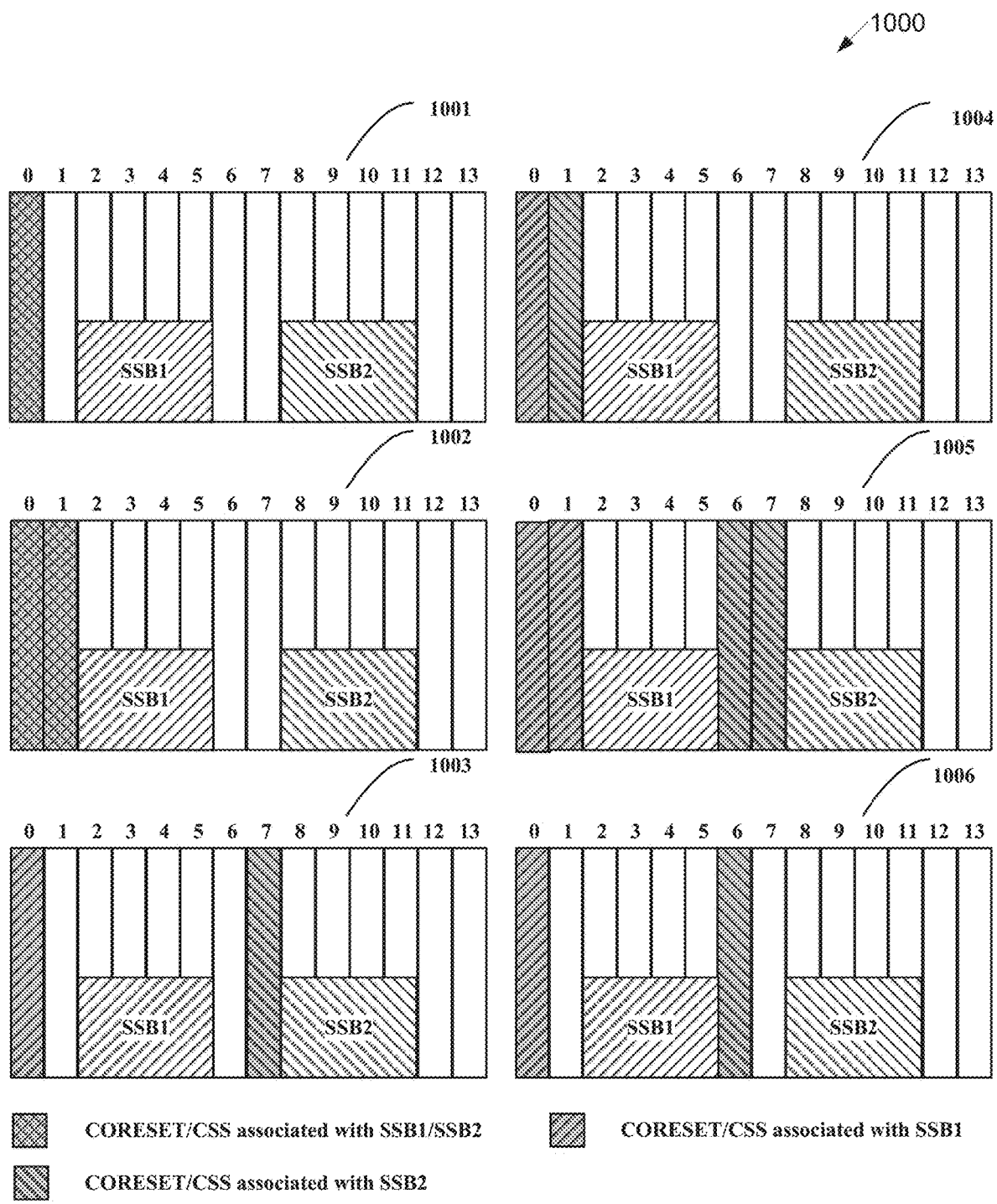
FIG. 10 illustrates an example configuration of CORESET/CSS for SSB Pattern 2 according to embodiments of the present disclosure.

FIG. 10 illustrates an example configuration of CORESET/CSS for SSB pattern 2 1000 according to embodiments of the present disclosure. An embodiment of the configuration of CORESET/CSS for SSB pattern 2 1000 shown in FIG. 10 is for illustration only. FIG. 10 does not limit a scope of the present disclosure.

When the number of symbols for CORESET is configured as 2, and 2 CSSs are configured within the CORESET and starting from symbol #0 and #7, correspondingly (e.g., 905 as illustrated in FIG. 9), PDSCH time domain resource allocation may support at least one of the following configurations as in TABLE 1-5.

TABLE 1-5

Examples of PDSCH time-domain resource mapping configuration

| Index | PDSCH mapping type | K_0 | S | L |
|---|---|---|---|---|
| 1 | Type A | 0 | 2 | 4 |
| 2 | Type A | 0 | 2 | 5 |
| 3 | Type B | 0 | 9 | 4 |
| 4 | Type B | 0 | 9 | 5 |

If the SS/PBCH block pattern is Pattern 2, as illustrated in FIG. 8 (e.g., 802), at least the following configurations may be supported.

When the number of symbols for CORESET is configured as 1, and 1 common search space (CSS) is configured within the CORESET and starting from symbol #0 (e.g., 1001 as illustrated in FIG. 10), PDSCH time domain resource allocation may support at least one of the following configurations as in TABLE 2-1.

TABLE 2-1

Examples of PDSCH time-domain resource mapping configuration

| Index | PDSCH mapping type | K_0 | S | L |
|---|---|---|---|---|
| 1 | Type A | 0 | 1 | 5 |
| 2 | Type A | 0 | 7 | 5 |
| 3 | Type A | 0 | 1 | 6 |
| 4 | Type A | 0 | 7 | 6 |
| 5 | Type A | 0 | 1 | 12 |
| 6 | Type A | 0 | 1 | 13 |

When the number of symbols for CORESET is configured as 2, and 1 CSS is configured within the CORESET and starting from symbol #0 (e.g., 1002 as illustrated in FIG. 10), PDSCH time domain resource allocation may support at least one of the following configurations as in TABLE 2-2.

TABLE 2-2

Examples of PDSCH time-domain resource mapping configuration

| Index | PDSCH mapping type | K_0 | S | L |
|---|---|---|---|---|
| 1 | Type A | 0 | 2 | 4 |
| 2 | Type A | 0 | 8 | 4 |
| 3 | Type A | 0 | 2 | 5 |
| 4 | Type A | 0 | 8 | 5 |
| 5 | Type A | 0 | 2 | 6 |
| 6 | Type A | 0 | 8 | 6 |
| 7 | Type A | 0 | 2 | 11 |
| 8 | Type A | 0 | 2 | 12 |

When the number of symbols for CORESET is configured as 1, and 2 CSSs are configured within the CORESET and starting from symbol #0 and #7, correspondingly (e.g., 1003 as illustrated in FIG. 10), PDSCH time domain resource allocation may support at least one of the following configurations as in TABLE 2-3.

TABLE 2-3

Examples of PDSCH time-domain resource mapping configuration

| Index | PDSCH mapping type | K_0 | S | L |
|---|---|---|---|---|
| 1 | Type A | 0 | 1 | 5 |
| 2 | Type A | 0 | 1 | 6 |
| 3 | Type B | 0 | 8 | 5 |
| 4 | Type B | 0 | 8 | 6 |

When the number of symbols for CORESET is configured as 1, and 2 CSSs are configured within the CORESET and starting from symbol #0 and #1, correspondingly (e.g., 1004 as illustrated in FIG. 10), PDSCH time domain resource allocation may support at least one of the following configurations as in TABLE 2-4.

TABLE 2-4

Examples of PDSCH time-domain resource mapping configuration

| Index | PDSCH mapping type | K_0 | S | L |
|---|---|---|---|---|
| 1 | Type A | 0 | 2 | 4 |
| 2 | Type B | 0 | 8 | 4 |
| 3 | Type A | 0 | 2 | 5 |
| 4 | Type B | 0 | 8 | 5 |
| 5 | Type A | 0 | 2 | 6 |
| 6 | Type B | 0 | 8 | 6 |

When the number of symbols for CORESET is configured as 2, and 2 CSSs are configured within the CORESET and starting from symbol #0 and #6, correspondingly (e.g., 1005 as illustrated in FIG. 10), PDSCH time domain resource allocation may support at least one of the following configurations as in TABLE 2-5.

TABLE 2-5

Examples of PDSCH time-domain resource mapping configuration

| Index | PDSCH mapping type | K_0 | S | L |
|---|---|---|---|---|
| 1 | Type A | 0 | 2 | 4 |
| 2 | Type B | 0 | 8 | 4 |

When the number of symbols for CORESET is configured as 1, and 2 CSSs are configured within the CORESET and starting from symbol #0 and #6, correspondingly (e.g., 1006 as illustrated in FIG. 10), PDSCH time domain resource allocation may support at least one of the following configurations as in TABLE 2-6.

TABLE 2-6

Examples of PDSCH time-domain resource mapping configuration

| Index | PDSCH mapping type | K_0 | S | L |
|---|---|---|---|---|
| 1 | Type A | 0 | 2 | 4 |
| 2 | Type B | 0 | 8 | 4 |
| 3 | Type A | 0 | 1 | 5 |
| 4 | Type B | 0 | 7 | 5 |

In yet another embodiment, the UE determines the PDSCH mapping type regardless of the configuration of CORESET or CSS.

If the SS/PBCH block pattern is Pattern 1, as in illustrated in FIG. 8 (e.g., 801), and the duration of symbols for Type B PDSCH mapping is limited to 2, 4, and 7, then at least the following examples or part of the following examples (e.g., TABLES 3-1, 3-2, and 3-3) could be supported.

TABLE 3-1

Examples of PDSCH time-domain resource mapping configuration

| Index | PDSCH mapping type | K_0 | S | L |
|---|---|---|---|---|
| 1 | Type A | 0 | 2 | 4 |
| 2 | Type A | 0 | 1 | 5 |
| 3 | Type A | 0 | 1 | 6 |
| 4 | Type A | 0 | 1 | 12 |
| 5 | Type A | 0 | 1 | 13 |
| 6 | Type A | 0 | 2 | 5 |
| 7 | Type A | 0 | 2 | 11 |
| 8 | Type A | 0 | 2 | 12 |
| 9 | Type B | 0 | 9 | 4 |

In one variant to this set of examples (e.g., TABLE 3-1), at least one extra entry as in TABLE 3-2 is supported or merged with the configuration with same K_0, S, and L, but PDSCH mapping Type B (e.g., the corresponding value for PDSCH mapping type in the table changed to "Tape A and Type B").

TABLE 3-2

Examples of PDSCH time-domain resource mapping configuration

| Index | PDSCH mapping type | K_0 | S | L |
|---|---|---|---|---|
| — | Type A | 0 | 9 | 4 |
| — | Type A | 0 | 9 | 5 |
| — | Type A | 0 | 8 | 5 |
| — | Type A | 0 | 8 | 6 |

In another variant to this set of examples (e.g., TABLE 3-1), one extra entry as in TABLE 3-3 is supported.

TABLE 3-3

Examples of PDSCH time-domain resource mapping configuration

| Index | PDSCH mapping type | K_0 | S | L |
|---|---|---|---|---|
| — | Type A | 0 | 2 | 6 |

If the SS/PBCH block pattern is Pattern 1, as illustrated in FIG. 8 (e.g., 801), and the duration of symbols for Type B PDSCH mapping is limited to 2, 4, 5, and 7, then at least the following examples or part of the following examples (e.g., TABLES 4-1, 4-2, and 4-3) could be supported.

TABLE 4-1

Examples of PDSCH time-domain resource mapping configuration

| Index | PDSCH mapping type | K_0 | S | L |
|---|---|---|---|---|
| 1 | Type A | 0 | 2 | 4 |
| 2 | Type A | 0 | 1 | 5 |
| 3 | Type A | 0 | 1 | 6 |
| 4 | Type A | 0 | 1 | 12 |
| 5 | Type A | 0 | 1 | 13 |
| 6 | Type A | 0 | 2 | 5 |
| 7 | Type A | 0 | 2 | 11 |
| 8 | Type A | 0 | 2 | 12 |
| 9 | Type B | 0 | 9 | 4 |
| 10 | Type B | 0 | 9 | 5 |
| 11 | Type B | 0 | 8 | 5 |

In one variant to this set of examples (e.g., TABLE 4-1), at least one extra entry as in TABLE 4-2 is supported or merged with the configuration with same K_0, S, and L, but PDSCH mapping Type B (e.g., the corresponding value for PDSCH mapping type in the table changed to "Tape A and Type B").

TABLE 4-2

Examples of PDSCH time-domain resource mapping configuration

| Index | PDSCH mapping type | K_0 | S | L |
|---|---|---|---|---|
| — | Type A | 0 | 9 | 4 |
| — | Type A | 0 | 9 | 5 |
| — | Type A | 0 | 8 | 5 |
| — | Type A | 0 | 8 | 6 |

In another variant to this set of examples (e.g., TABLE 4-1), one extra entry as in TABLE 4-3 is supported.

TABLE 4-3

Examples of PDSCH time-domain resource mapping configuration

| Index | PDSCH mapping type | K_0 | S | L |
|---|---|---|---|---|
| — | Type A | 0 | 2 | 6 |

If the SS/PBCH block pattern is Pattern 1, as illustrated in FIG. 8 (e.g., 801), and the duration of symbols for Type B PDSCH mapping is limited to 2, 4, 6, and 7, then at least the following examples or part of the following examples (e.g., TABLES 5-1 and 5-2) could be supported.

TABLE 5-1

Examples of PDSCH time-domain resource mapping configuration

| Index | PDSCH mapping type | K_0 | S | L |
|---|---|---|---|---|
| 1 | Type A | 0 | 2 | 4 |
| 2 | Type A | 0 | 1 | 5 |
| 3 | Type A | 0 | 1 | 6 |
| 4 | Type A | 0 | 1 | 12 |
| 5 | Type A | 0 | 1 | 13 |
| 6 | Type A | 0 | 2 | 5 |
| 7 | Type A | 0 | 2 | 11 |
| 8 | Type A | 0 | 2 | 12 |
| 9 | Type B | 0 | 9 | 4 |
| 10 | Type B | 0 | 8 | 6 |
| 11 | Type A | 0 | 2 | 6 |

In one variant to this set of examples (e.g., TABLE 5-1), at least one extra entry as in TABLE 5-2 is supported or merged with the configuration with same K_0, S, and L, but PDSCH mapping Type B (e.g., the corresponding value for PDSCH mapping type in the table changed to "Tape A and Type B").

TABLE 5-3

Examples of PDSCH time-domain resource mapping configuration

| Index | PDSCH mapping type | K_0 | S | L |
|---|---|---|---|---|
| — | Type A | 0 | 9 | 4 |
| — | Type A | 0 | 9 | 5 |
| — | Type A | 0 | 8 | 5 |
| — | Type A | 0 | 8 | 6 |

If the SS/PBCH block pattern is Pattern 1, as illustrated in FIG. 8 (e.g., 801), and the duration of symbols for Type B PDSCH mapping is limited to 2, 4, 5, 6, and 7, then at least the following examples or part of the following examples (e.g., TABLES 6-1 and 6-2) could be supported.

TABLE 6-1

Examples of PDSCH time-domain resource mapping configuration

| Index | PDSCH mapping type | K_0 | S | L |
|---|---|---|---|---|
| 1 | Type A | 0 | 2 | 4 |
| 2 | Type A | 0 | 1 | 5 |
| 3 | Type A | 0 | 1 | 6 |
| 4 | Type A | 0 | 1 | 12 |
| 5 | Type A | 0 | 1 | 13 |
| 6 | Type A | 0 | 2 | 5 |
| 7 | Type A | 0 | 2 | 11 |
| 8 | Type A | 0 | 2 | 12 |
| 9 | Type B | 0 | 9 | 4 |
| 10 | Type B | 0 | 8 | 6 |
| 11 | Type A | 0 | 2 | 6 |
| 12 | Type B | 0 | 9 | 5 |
| 13 | Type B | 0 | 8 | 5 |

In one variant to this set of examples (e.g., TABLE 6-1), at least one extra entry as in TABLE 6-2 is supported or merged with the configuration with same K_0, S, and L, but PDSCH mapping Type B (e.g., the corresponding value for PDSCH mapping type in the table changed to "Tape A and Type B").

TABLE 6-2

Examples of PDSCH time-domain resource mapping configuration

| Index | PDSCH mapping type | K_0 | S | L |
|---|---|---|---|---|
| — | Type A | 0 | 9 | 4 |
| — | Type A | 0 | 9 | 5 |
| — | Type A | 0 | 8 | 5 |
| — | Type A | 0 | 8 | 6 |

If the SS/PBCH block pattern is Pattern 2, as illustrated in FIG. 8 (e.g., 802), and the duration of symbols for Type B PDSCH mapping is limited to 2, 4, and 7, then at least the following examples or part of the following examples (e.g., TABLES 7-1 to 7-2) could be supported.

In example, one of the following Type B examples with {K_0, S, L}={0, 6, 7} or {0, 7, 7} (e.g., Index 10 and 11 in TABLE 7-1) may be supported to address the scenario of single SS/PBCH block (e.g., first SS/PBCH block in the slot), as shown in FIG. 8.

TABLE 7-1

Examples of PDSCH time-domain resource mapping configuration

| Index | dmrs-TypeA-Position | PDSCH mapping type | K_0 | S | L |
|---|---|---|---|---|---|
| 1 | 2 or 3 | Type A | 0 | 2 | 4 |
| 2 | 2 or 3 | Type A | 0 | 1 | 5 |
| 3 | 2 or 3 | Type A | 0 | 1 | 6 |
| 4 | 2 or 3 | Type A | 0 | 1 | 12 |
| 5 | 2 or 3 | Type A | 0 | 1 | 13 |
| 6 | 2 or 3 | Type A | 0 | 2 | 5 |
| 7 | 2 or 3 | Type A | 0 | 2 | 11 |
| 8 | 2 or 3 | Type A | 0 | 2 | 12 |
| 9 | 2 or 3 | Type B | 0 | 8 | 4 |
| 10 | 2 or 3 | Type B | 0 | 6 | 7 |
| 11 | 2 or 3 | Type B | 0 | 7 | 7 |
| 12 | 2 or 3 | Type A | 0 | 1 | 7 |
| 13 | 2 or 3 | Type A | 0 | 2 | 6 |
| 14 | 2 or 3 | Type B | 0 | 9 | 4 |
| 15 | 2 or 3 | Type B | 0 | 10 | 4 |
| 16 | 2 or 3 | Type A | 0 | 0 | 14 |
| 17 | 2 or 3 | Type A | 0 | 0 | 12 |
| 18 | 2 or 3 | Type A | 0 | 0 | 11 |
| 19 | 2 or 3 | Type A | 0 | 0 | 9 |

TABLE 7-1-continued

Examples of PDSCH time-domain resource mapping configuration

| Index | dmrs-TypeA-Position | PDSCH mapping type | K_0 | S | L |
|---|---|---|---|---|---|
| 20 | 2 or 3 | Type A | 0 | 0 | 7 |
| 21 | 2 or 3 | Type B | 0 | 3 | 4 |
| 22 | 2 or 3 | Type B | 0 | 5 | 4 |
| 23 | 2 or 3 | Type B | 0 | 7 | 4 |
| 24 | 2 or 3 | Type A | 0 | 2 | 2 |
| 25 | 2 or 3 | Type B | 0 | 3 | 2 |
| 26 | 2 or 3 | Type B | 0 | 4 | 2 |
| 27 | 2 or 3 | Type B | 0 | 6 | 2 |
| 28 | 2 or 3 | Type B | 0 | 7 | 2 |
| 29 | 2 or 3 | Type B | 0 | 8 | 2 |
| 30 | 2 or 3 | Type B | 0 | 10 | 2 |
| 31 | 2 or 3 | Type B | 0 | 11 | 2 |
| 32 | 2 or 3 | Type A | 0 | 0 | 11 |
| 33 | 2 or 3 | Type A | 0 | 0 | 9 |
| 34 | 2 or 3 | Type A | 0 | 0 | 8 |
| 35 | 2 or 3 | Type A | 0 | 0 | 6 |
| 36 | 2 or 3 | Type A | 0 | 0 | 3 |

In one variant to this set of examples (e.g., TABLE 7-1), at least one extra entry as in TABLE 7-2 is supported or merged with the configuration with same K_0, S, and L, but PDSCH mapping Type B (e.g., the corresponding value for PDSCH mapping type in the table changed to "Tape A and Type B").

TABLE 7-2

Examples of PDSCH time-domain resource mapping configuration

| Index | PDSCH mapping type | K_0 | S | L |
|---|---|---|---|---|
| — | Type A | 0 | 8 | 4 |
| — | Type A | 0 | 7 | 5 |
| — | Type A | 0 | 8 | 5 |
| — | Type A | 0 | 7 | 6 |
| — | Type A | 0 | 8 | 6 |
| — | Type A | 0 | 6 | 7 |
| — | Type A | 0 | 7 | 7 |
| — | Type A | 0 | 9 | 4 |
| — | Type A | 0 | 10 | 5 |

In another variant to this set of examples (e.g., TABLE 7-2), one extra entry as in TABLE 7-3 is supported.

TABLE 7-3

Examples of PDSCH time-domain resource mapping configuration

| Index | PDSCH mapping type | K_0 | S | L |
|---|---|---|---|---|
| — | Type A | 0 | 2 | 6 |

If the SS/PBCH block pattern is Pattern 2, as illustrated in FIG. 8 (e.g., 802), and the duration of symbols for Type B PDSCH mapping is limited to 2, 4, 5, and 7, then at least the following examples or part of the following examples (e.g., TABLES 8-1, 8-2, and 8-3) could be supported.

TABLE 8-1

Examples of PDSCH time-domain resource mapping configuration

| Index | PDSCH mapping type | K_0 | S | L |
|---|---|---|---|---|
| 1 | Type A | 0 | 2 | 4 |
| 2 | Type A | 0 | 1 | 5 |
| 3 | Type A | 0 | 1 | 6 |
| 4 | Type A | 0 | 1 | 12 |

TABLE 8-1-continued

Examples of PDSCH time-domain resource mapping configuration

| Index | PDSCH mapping type | K_0 | S | L |
|---|---|---|---|---|
| 5 | Type A | 0 | 1 | 13 |
| 6 | Type A | 0 | 2 | 5 |
| 7 | Type A | 0 | 2 | 11 |
| 8 | Type A | 0 | 2 | 12 |
| 9 | Type B | 0 | 8 | 4 |
| 10 | Type B | 0 | 8 | 5 |
| 11 | Type B | 0 | 7 | 5 |

In one variant to this set of examples (e.g., TABLE 8-1), at least one extra entry as in TABLE 8-2 is supported or merged with the configuration with same K_0, S, and L, but PDSCH mapping Type B (e.g., the corresponding value for PDSCH mapping type in the table changed to "Tape A and Type B").

TABLE 8-2

Examples of PDSCH time-domain resource mapping configuration

| Index | PDSCH mapping type | K_0 | S | L |
|---|---|---|---|---|
| — | Type A | 0 | 8 | 4 |
| — | Type A | 0 | 7 | 5 |
| — | Type A | 0 | 8 | 5 |
| — | Type A | 0 | 7 | 6 |
| — | Type A | 0 | 8 | 6 |

In another variant to this set of examples (e.g., TABLE 8-1), one extra entry as in TABLE 8-3 is supported or merged with the configuration with same K_0, S, and L, but PDSCH mapping Type B (e.g., the corresponding value for PDSCH mapping type in the table changed to "Tape A and Type B").

TABLE 8-3

Examples of PDSCH time-domain resource mapping configuration

| Index | PDSCH mapping type | K_0 | S | L |
|---|---|---|---|---|
| — | Type A | 0 | 2 | 6 |

If the SS/PBCH block pattern is Pattern 2, as illustrated in FIG. 8 (e.g., 802), and the duration of symbols for Type B PDSCH mapping is limited to 2, 4, 6, and 7, then at least the following examples or part of the following examples (e.g., TABLES 9-1 and 9-2) could be supported.

TABLE 9-1

Examples of PDSCH time-domain resource mapping configuration

| Index | PDSCH mapping type | K_0 | S | L |
|---|---|---|---|---|
| 1 | Type A | 0 | 2 | 4 |
| 2 | Type A | 0 | 1 | 5 |
| 3 | Type A | 0 | 1 | 6 |
| 4 | Type A | 0 | 1 | 12 |
| 5 | Type A | 0 | 1 | 13 |
| 6 | Type A | 0 | 2 | 5 |
| 7 | Type A | 0 | 2 | 11 |
| 8 | Type A | 0 | 2 | 12 |
| 9 | Type B | 0 | 8 | 4 |
| 10 | Type B | 0 | 8 | 6 |
| 11 | Type B | 0 | 7 | 6 |
| 12 | Type A | 0 | 2 | 6 |

In one variant to this set of examples (e.g., TABLE 9-1), at least one extra entry as in TABLE 9-2 is supported or merged with the configuration with same K_0, S, and L, but PDSCH mapping Type B (e.g., the corresponding value for PDSCH mapping type in the table changed to "Tape A and Type B").

TABLE 9-2

Examples of PDSCH time-domain resource mapping configuration

| Index | PDSCH mapping type | K_0 | S | L |
|---|---|---|---|---|
| — | Type A | 0 | 8 | 4 |
| — | Type A | 0 | 7 | 5 |
| — | Type A | 0 | 8 | 5 |
| — | Type A | 0 | 7 | 6 |
| — | Type A | 0 | 8 | 6 |

If the SS/PBCH block pattern is Pattern 2, as illustrated in FIG. 8 (e.g., 802), and the duration of symbols for Type B PDSCH mapping is limited to 2, 4, 5, 6, and 7, then at least the following examples or part of the following examples (e.g., TABLES 10-1 and 10-2) could be supported.

TABLE 10-1

Examples of PDSCH time-domain resource mapping configuration

| Index | PDSCH mapping type | K_0 | S | L |
|---|---|---|---|---|
| 1 | Type A | 0 | 2 | 4 |
| 2 | Type A | 0 | 1 | 5 |
| 3 | Type A | 0 | 1 | 6 |
| 4 | Type A | 0 | 1 | 12 |
| 5 | Type A | 0 | 1 | 13 |
| 6 | Type A | 0 | 2 | 5 |
| 7 | Type A | 0 | 2 | 11 |
| 8 | Type A | 0 | 2 | 12 |
| 9 | Type B | 0 | 8 | 4 |
| 10 | Type B | 0 | 8 | 6 |
| 11 | Type B | 0 | 7 | 6 |
| 12 | Type A | 0 | 2 | 6 |
| 10 | Type B | 0 | 8 | 5 |
| 11 | Type B | 0 | 7 | 5 |

In one variant to this set of examples (e.g., TABLE 10-1), at least one extra entry as in TABLE 10-2 is supported or merged with the configuration with same K_0, S, and L, but PDSCH mapping Type B (e.g., the corresponding value for PDSCH mapping type in the table changed to "Tape A and Type B").

TABLE 10-2

Examples of PDSCH time-domain resource mapping configuration

| Index | PDSCH mapping type | K_0 | S | L |
|---|---|---|---|---|
| — | Type A | 0 | 8 | 4 |
| — | Type A | 0 | 7 | 5 |
| — | Type A | 0 | 8 | 5 |
| — | Type A | 0 | 7 | 6 |
| — | Type A | 0 | 8 | 6 |

In yet another embodiment, the UE determines the PDSCH mapping type based on the location of the received SS/PBCH block in the slot. For example, if there are two CSSs configured with starting symbol as #0 and #7, correspondingly, then the UE assumes PDSCH mapping Type A if the received SS/PBCH block is the first SS/PBCH block within the slot, and the UE assumes PDSCH mapping Type B if the received SS/PBCH block is the second SS/PBCH block within the slot.

In one embodiment, there can at least one indication of the actually transmitted SS/PBCH block(s) in addition to the supported indication of actually transmitted SS/PBCH blocks within the burst as in NR standard specification, and at least one of the following approaches can be supported for this purpose.

In one example, there is an indication of all the actually transmitted SS/PBCH blocks within the DRS transmission window by the PBCH payload (e.g., MIB).

In one example, the indication is a bitmap with length equal to the maximum number of potential SS/PBCH blocks within the DRS transmission window, and each bit in the bitmap indicates whether the corresponding SS/PBCH block is actually transmitted or not (e.g., 1 means transmitted, and 0 means not transmitted).

In another example, the indication is a bitmap with length equal to the maximum number of actually transmitted SS/PBCH blocks within the DRS transmission window, each bit in the bitmap indicates whether the corresponding SS/PBCH block is actually transmitted or not (e.g., 1 means transmitted, and 0 means not transmitted).

In one instance, the indication of the actually transmitted SS/PBCH blocks by the PBCH content may be consistent with the indication of actually transmitted SS/PBCH blocks by RMSI and/or RRC.

In another instance, the indication of actually transmitted SS/PBCH blocks by RMSI and/or RRC can override the indication of the actually transmitted SS/PBCH blocks by the PBCH content.

In yet another instance, there is an indication of the actually transmitted SS/PBCH blocks within the slot containing the SS/PBCH blocks by the PBCH payload (e.g., bits not in MIB).

In one example, the indication is a bitmap with length 2, where the first bit in the bitmap indicates whether the first SS/PBCH block in the slot is actually transmitted or not, and the second bit in the bitmap indicates whether the second SS/PBCH block in the slot is actually transmitted or not (e.g., 1 means transmitted, and 0 means not transmitted).

In another example, the indication is using 1 bit, which is utilized to indicate whether the other SS/PBCH block within the same slot of the received SS/PBCH block is actually transmitted or not.

In yet another example, the indication is using 1 bit, where the 1 bit is indicating either one of two SS/PBCH blocks within a slot is actually transmitted. In one aspect of this example, if one SS/PBCH block within a slot is actually transmitted, the location of the actually transmitted SS/PBCH block is known to the UE, e.g., by fixed as the first or the second potential SS/PBCH block in the slot.

In one instance, the indication of the actually transmitted SS/PBCH blocks within the slot by the PBCH content may be consistent with the indication of actually transmitted SS/PBCH blocks by RMSI and/or RRC.

In another instance, the indication of actually transmitted SS/PBCH blocks by RMSI and/or RRC can override the indication of the actually transmitted SS/PBCH blocks within the slot by the PBCH content.

In yet another instance, there is an indication of all the actually transmitted SS/PBCH blocks within the DRS transmission window by DCI format that containing the scheduling information of the PDSCH.

In one example, the indication is a bitmap with length equal to the maximum number of SS/PBCH blocks possibly transmitted within the DRS transmission window, and each bit in the bitmap indicates whether the corresponding SS/PBCH block is actually transmitted or not (e.g., 1 means transmitted, and 0 means not transmitted).

In another example, the indication is a bitmap with length equal to the maximum number of actually transmitted SS/PBCH blocks within the DRS transmission window, each bit in the bitmap indicates whether the corresponding SS/PBCH block is actually transmitted or not (e.g., 1 means transmitted, and 0 means not transmitted).

In one instance, the indication of the actually transmitted SS/PBCH blocks by the DCI format may be consistent with the indication of actually transmitted SS/PBCH blocks by RMSI and/or RRC.

In another instance, the indication of actually transmitted SS/PBCH blocks by RMSI and/or RRC can override the indication of the actually transmitted SS/PBCH blocks by the DCI format.

In yet another instance, the indication of actually transmitted SS/PBCH blocks by the DCI format can override the indication of the actually transmitted SS/PBCH blocks by RMSI and/or RRC.

In yet another instance, the DCI format considered in this approach can be restricted to the DCI format with CRC scrambled by SI-RNTI and the corresponding CSS set is a Type0-PDCCH CSS set (e.g., DCI format for RMSI).

In yet another instance, the DCI format considered in this approach can be restricted to the one carried by at least one of DCI format with CRC scrambled by SI-RNTI (e.g., DCI for RMSI or OSI), or DCI format with CRC scrambled by P-RNTI (e.g., DCI format for paging).

In yet another instance, there is an indication of the actually transmitted SS/PBCH blocks within the slot containing the SS/PBCH blocks by DCI format that containing the scheduling information of the PDSCH.

In one example, the indication is a bitmap with length 2, where the first bit in the bitmap indicates whether the first SS/PBCH block in the slot is actually transmitted or not, and the second bit in the bitmap indicates whether the second SS/PBCH block in the slot is actually transmitted or not (e.g., 1 means transmitted, and 0 means not transmitted).

In another example, the indication is using 1 bit, which is utilized to indicate whether the other SS/PBCH block not QCLed with the DMRS of PDCCH containing the DCI format is actually transmitted or not. For instance, the bit in the DCI format carried by the PDCCH associated with the first SS/PBCH block indicates whether the second SS/PBCH block is actually transmitted or not, and the bit in the DCI format carried by the PDCCH associated with the second SS/PBCH block indicates whether the first SS/PBCH block is actually transmitted or not (e.g., 1 means transmitted, and 0 means not transmitted).

If a UE detects the indicator in the DCI format taking value of 1, the UE assumes both SS/PBCH blocks in the slot are actually transmitted, and the RBs/REs for SS/PBCH blocks are not available for PDSCH. If a UE detects the indicator in the DCI format taking value of 0, the UE assumes only the received SS/PBCH block in the slot is actually transmitted and the other SS/PBCH block within the slot is not actually transmitted, and the RBs/REs for the received SS/PBCH block is not available for PDSCH and the RBs/REs for the other SS/PBCH block within the slot could be available for PDSCH.

In another example, the indication is using 1 bit, which is utilized to indicate whether there are 1 or 2 SS/PBCH blocks is actually transmitted. For instance, if a UE detects the indicator in the DCI format taking value of 1, the UE assumes both SS/PBCH blocks in the slot are actually transmitted, and the RBs/REs for SS/PBCH blocks are not available for PDSCH. If a UE detects the indicator in the DCI format taking value of 0, the UE assumes only one SS/PBCH block in the slot is actually transmitted and which one of the SS/PBCH blocks within the slot actually transmitted is predefined (e.g., fixed as the first one or the second one), and the RBs/REs for the actually transmitted SS/PBCH block is not available for PDSCH and the RBs/REs for the other SS/PBCH block within the slot could be available for PDSCH.

In one instance, the indication of the actually transmitted SS/PBCH blocks within the slot by the DCI format may be consistent with the indication of actually transmitted SS/PBCH blocks by RMSI and RRC.

In another instance, the indication of actually transmitted SS/PBCH blocks by RMSI and/or RRC can override the indication of the actually transmitted SS/PBCH blocks by the DCI format.

In yet another instance, the indication of actually transmitted SS/PBCH blocks by the DCI format can override the indication of the actually transmitted SS/PBCH blocks by RMSI and/or RRC.

In yet another instance, the DCI format considered in this approach can be restricted to the DCI format with CRC scrambled by SI-RNTI and the corresponding CSS set is a Type0-PDCCH CSS set (e.g., DCI format for RMSI).

In yet another instance, the DCI format considered in this approach can be restricted to the one carried by at least one of DCI format with CRC scrambled by SI-RNTI (e.g., DCI for RMSI or OSI), or DCI format with CRC scrambled by P-RNTI (e.g., DCI format for paging).

Figure 11:
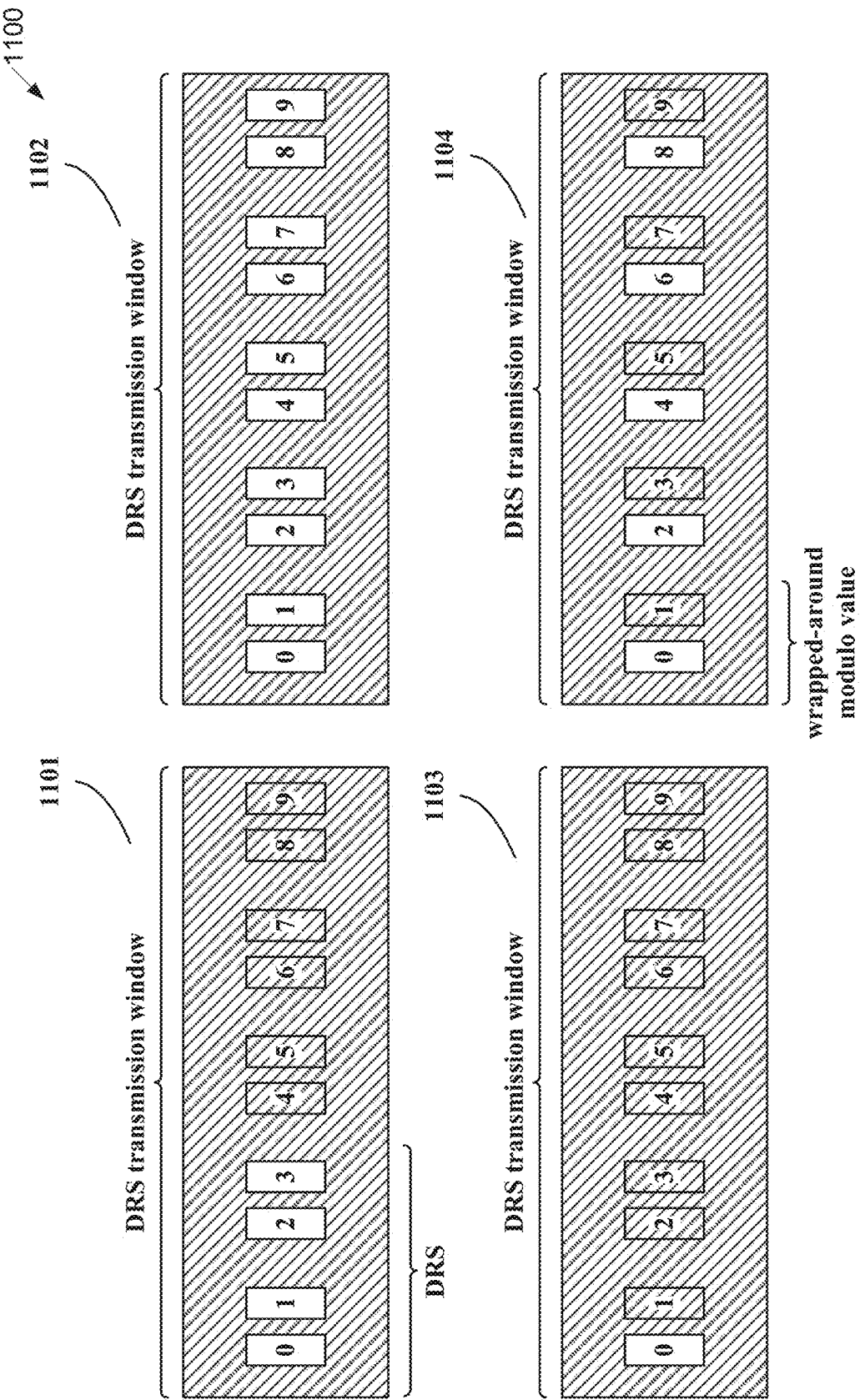
FIG. 11 illustrates an example PDSCH resource mapping according to SS/PBCH blocks in DRS according to embodiments of the present disclosure.

FIG. 11 illustrates an example PDSCH resource mapping 1100 according to SS/PBCH blocks in DRS according to embodiments of the present disclosure. An embodiment of the PDSCH resource mapping 1100 shown in FIG. 11 is for illustration only. FIG. 11 does not limit a scope of the present disclosure.

In one embodiment, a UE assumes the RBs/REs mapped for all potential SS/PBCH block(s) as part of NR-U DRS are not available for PDSCH, e.g., where the NR-U DRS is within a DRS transmission window. For example, a gNB may rate match around the RBs/REs mapped for all potential SS/PBCH block as part of NR-U DRS, regardless of actually transmitted SS/PBCH block(s).

In one aspect of this embodiment, a gNB indicates the UE a time-domain location of the DRS within the DRS transmission window. FIG. 11 (e.g., 1101) illustrates an example of this embodiment, where RBs/REs mapped for all potential SS/PBCH blocks as part of DRS are not available for PDSCH, and RBs/REs mapped for all potential SS/PBCH blocks not as part of DRS can be available for PDSCH.

In one example, the DCI format considered in this approach can be restricted to the DCI format with CRC scrambled by SI-RNTI and the corresponding CSS set is a Type0-PDCCH CSS set (e.g., DCI format for RMSI).

In another embodiment, a UE assumes the RBs/REs mapped for all potential SS/PBCH block(s) within a DRS transmission window are not available for PDSCH. For example, a gNB may rate match around the RBs/REs mapped for all potential SS/PBCH block within a DRS transmission window, regardless of actually transmitted SS/PBCH block(s).

FIG. 11 (e.g., 1102) illustrates an example of this embodiment, where RBs/REs mapped for all potential SS/PBCH blocks within the DRS transmission window are not available for PDSCH.

In one example, the PDSCH for this embodiment can be restricted to the PDSCH scheduled by Type0-PDCCH with CRC scrambled by SI-RNTI (e.g., PDSCH of RMSI).

In yet another embodiment, a UE assumes the RBs/REs mapped for actually transmitted SS/PBCH block(s) as part of NR-U DRS are not available for PDSCH. For example, a gNB may rate match around the RBs/REs mapped for actually transmitted SS/PBCH block as part of NR-U DRS.

FIG. 11 (e.g., 1103) illustrates an example of this embodiment, where RBs/REs mapped for actually transmitted SS/PBCH block(s) as part of NR-U DRS are not available for PDSCH (e.g., SSB #0 is actually transmitted in 1103), and RBs/REs not mapped for actually transmitted SS/PBCH block(s) as part of DRS can be available for PDSCH.

In one example, the actually transmitted SS/PBCH block(s) as part of NR-U DRS can be indicated as the actually transmitted SS/PBCH block(s) in a slot (e.g., by PBCH content or DCI format according to the embodiments of this disclosure), and the PDSCH for this embodiment can be restricted to the PDSCH scheduled by Type0-PDCCH with CRC scrambled by SI-RNTI (e.g., PDSCH of RMSI). For example, a UE assumes the RBs/REs mapped for actually transmitted SS/PBCH block(s) within a slot are not available for PDSCH, where PDSCH is scheduled by Type0-PDCCH with CRC scrambled by SI-RNTI and in the same slot as the actually transmitted SS/PBCH block(s).

In another example, there can be no indication of the actually transmitted SS/PBCH blocks within the slot, and UE can determine the rate matching behavior based on resource mapping information of PDSCH. For example, if the symbols for resource mapping of PDSCH overlap with symbols containing SS/PBCH block within the same slot without QCL assumption with the DMRS of PDCCH containing the DCI format, the UE assumes the SS/PBCH block within the same slot and without QCL assumption with the DMRS of PDCCH containing the DCI format is not actually transmitted.

In yet another embodiment, a UE assumes the RBs/REs mapped for potentially actually transmitted SS/PBCH block(s) within a DRS transmission window are not available for PDSCH. Potentially actually transmitted SS/PBCH block(s) within a DRS transmission window are selected from the candidate SS/PBCH blocks within the DRS transmission window, according to the indication of actually transmitted SS/PBCH blocks (e.g., ssb-PositionsInBrst in RMSI and/or RRC) and the wrapped-around modulo value (e.g., QCL assumption indicated by PBCH or RMSI).

In one example, the potentially actually transmitted SS/PBCH block(s) within a DRS transmission window can be a bitmap with the first Q bits in the bitmap indicating the actually transmitted SS/PBCH blocks (e.g., by RMSI and/or RRC) repeated until the end of the DRS transmission window, where Q is the wrapped-around modulo value (e.g., QCL assumption), and a bit in the bitmap for the potentially actually transmitted SS/PBCH block(s) within a DRS transmission window indicates whether the corresponding SS/PBCH block within the DRS transmission window is potentially transmitted or not.

In another example, if the (i+1)th bit in the bitmap indicating the actually transmitted SS/PBCH blocks (e.g., ssb-PositionsInBurst in RMSI and/or RRC) takes a value of "1," the SS/PBCH block with candidate location within the DRS transmission window with index as (i+n*Q) is assumed to be potentially actually transmitted (e.g., may be transmitted by the gNB); and if the (i+1)-th bit in the bitmap indicating the actually transmitted SS/PBCH blocks (e.g., ssb-PositionsInBurst in RMSI and/or RRC) takes a value of "0", the SS/PBCH block with candidate location within the DRS transmission window with index as (i+n*Q) is assumed not to be actually transmitted (e.g., not transmitted by the gNB), where Q is the wrapped-around modulo value, (i+1) is the index in the bitmap with 0≤i≤Q−1, and n is a non-negative integer such that i+n*Q is smaller or equal to the maximum number of candidate SS/PBCH blocks within the DRS transmission window. A UE assumes the number of actually transmitted SS/PBCH blocks in the DRS transmission window is the number of "1"s in the first Q bits in the bitmap indicating the actually transmitted SS/PBCH blocks (e.g., by RMSI and/or RRC), and it is equivalent to the number of "1"s in the bitmap indicating the actually transmitted SS/PBCH blocks (e.g., by RMSI and/or RRC) if the bits other than the first Q bits take value of "0" in the bitmap.

Figure 12:
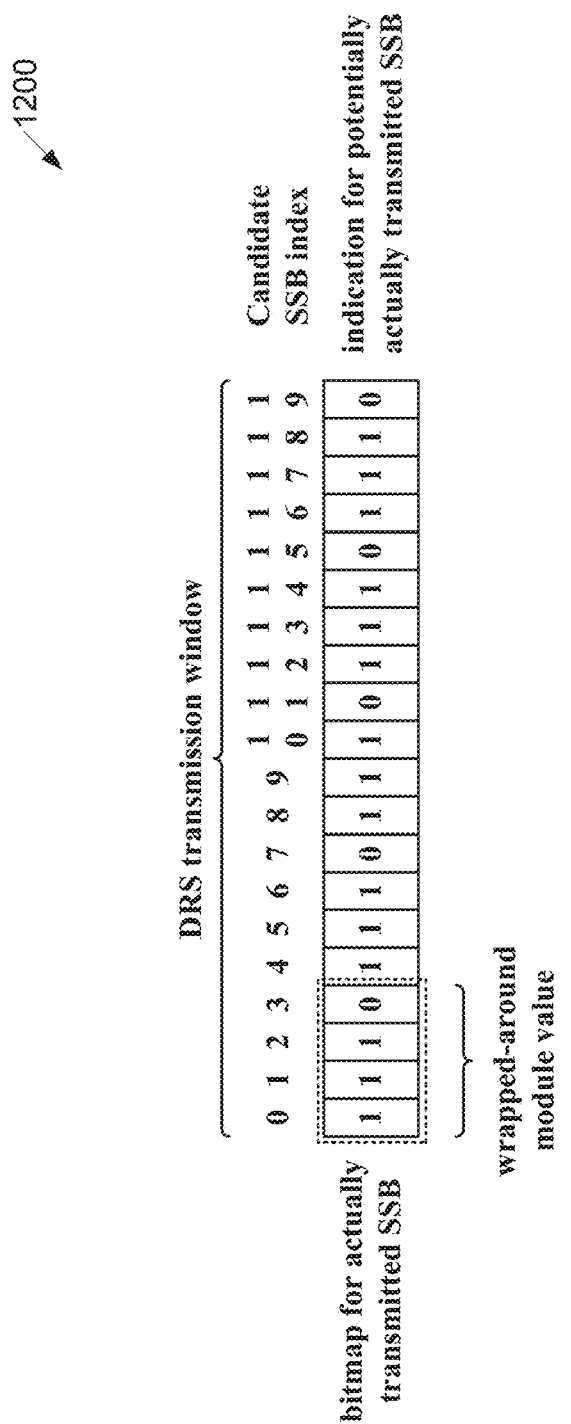
FIG. 12 illustrates an example potentially actually transmitted SS/PBCH block(s) within a DRS transmission window according to embodiments of the present disclosure.

FIG. 12 illustrates an example potentially actually transmitted SS/PBCH block(s) within a DRS transmission window 1200 according to embodiments of the present disclosure. An embodiment of the potentially actually transmitted SS/PBCH block(s) within a DRS transmission window 1200 shown in FIG. 12 is for illustration only. FIG. 12 does not limit a scope of the present disclosure.

FIG. 12 shows an example of potentially actually transmitted SS/PBCH block(s) within a DRS transmission window, where the considered DRS transmission window is configured with 20 candidate SS/PBCH block locations, and the wrapped-around modulo value Q=4, then the first 4 bit of the bitmap indicating the actually transmitted SS/PBCH blocks (e.g., ssb-PositionsInburst in RMSI and/or RRC) is repeated 5 times in the DRS transmission window (e.g., n=0, 1, 2, 3, or 4).

FIG. 11 (e.g., 1104) illustrates an example of this embodiment, where RBs/REs mapped for potentially actually transmitted SS/PBCH block(s) within a DRS transmission window are not available for PDSCH (e.g., SSB #0 is the indicated actually transmitted SSB and wrapped-around modulo value is 2 in 1104), and RBs/REs not mapped for potentially actually transmitted SS/PBCH block(s) within a DRS transmission window can be available for PDSCH.

In one example, the PDSCH for this embodiment can be restricted to the PDSCH not scheduled by Type0-PDCCH containing DCI format with CRC scrambled by SI-RNTI (e.g., PDSCH of RMSI). For example, a UE assumes the RBs/REs mapped for potentially actually transmitted SS/PBCH block(s) within a DRS transmission window are not available for PDSCH, where PDSCH is scheduled by DCI format other than the one for RMSI.

In another example, the potentially actually transmitted SS/PBCH block(s) within a DRS transmission window are also used for radio link monitoring. For example, RLM-RS corresponding to the potentially actually transmitted SS/PBCH block(s) within a DRS transmission window is used for in-sync and out-of-sync evaluation, and RLM-RS not corresponding to the potentially actually transmitted SS/PBCH block(s) within a DRS transmission window is not used for in-sync and out-of-sync evaluation.

In yet another example, the potentially actually transmitted SS/PBCH block(s) within a DRS transmission window are also used for PDCCH monitoring. In one approach, if a PDCCH candidate in a slot is mapped to one or more RE/RBs that overlap with REs/RBs of SS/PBCH block(s) location as the potentially actually transmitted SS/PBCH block(s) within a DRS transmission window, the UE does not expect to monitor the PDCCH candidate. In one example, the PDCCH considered in this approach can be restricted to any PDCCH other than Type0-PDCCH containing DCI format with CRC scrambled by SI-RNTI (e.g., PDCCH of RMSI).

In one embodiment, in order to support the enhanced configuration of PDSCH resource allocation for RMSI, as described in the present disclosure, the NR standard specification default PDSCH time domain resource allocation A for normal CP may be modified or enhanced.

Figure 13A:
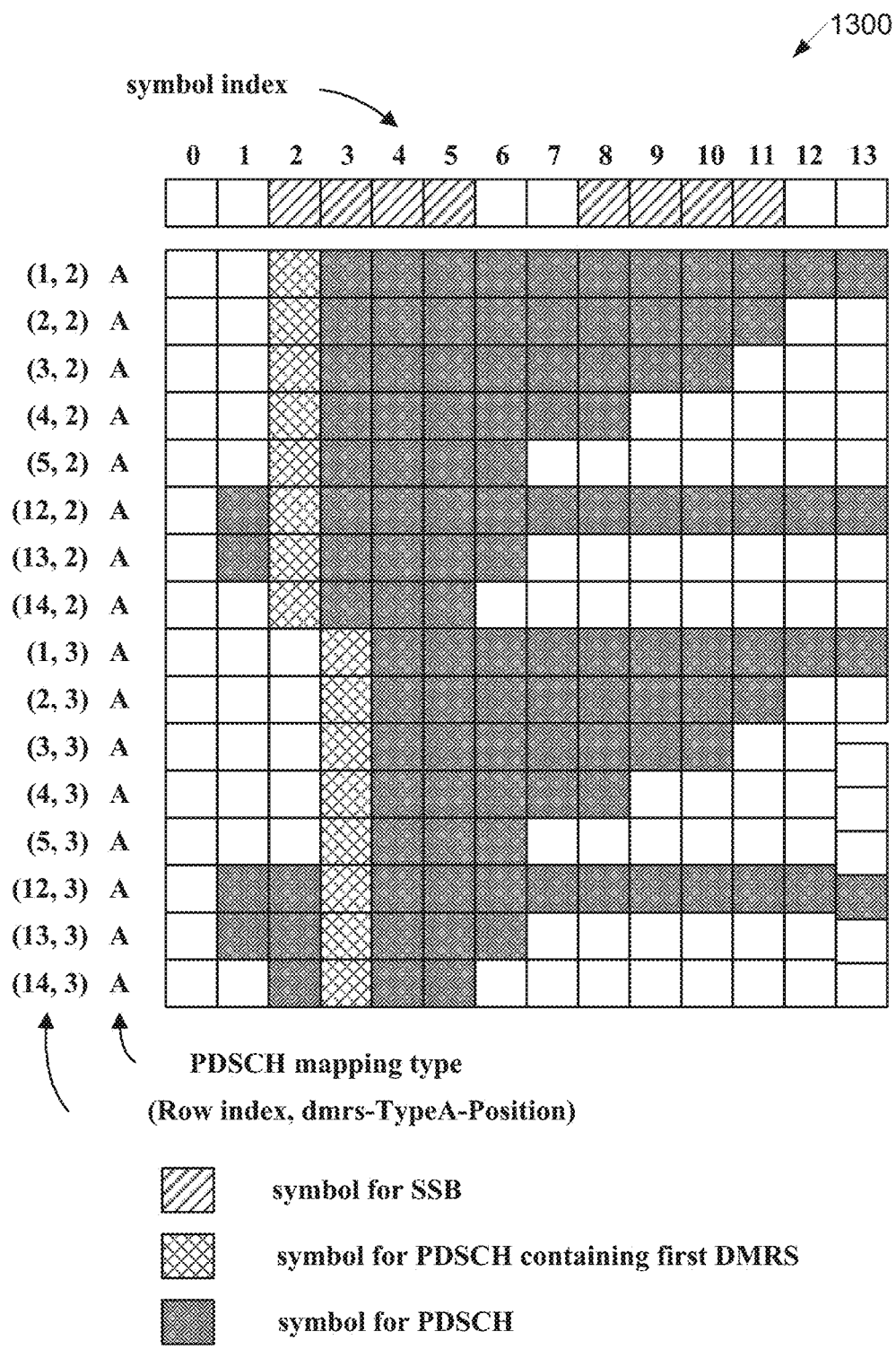
FIG. 13A illustrates an example Type A PDSCH resource mapping according to embodiments of the present disclosure.

FIG. 13A illustrates an example type A PDSCH resource mapping 1300 according to embodiments of the present disclosure. An embodiment of the type A PDSCH resource mapping 1300 shown in FIG. 13A is for illustration only. FIG. 13A does not limit a scope of the present disclosure.

Figure 13B:
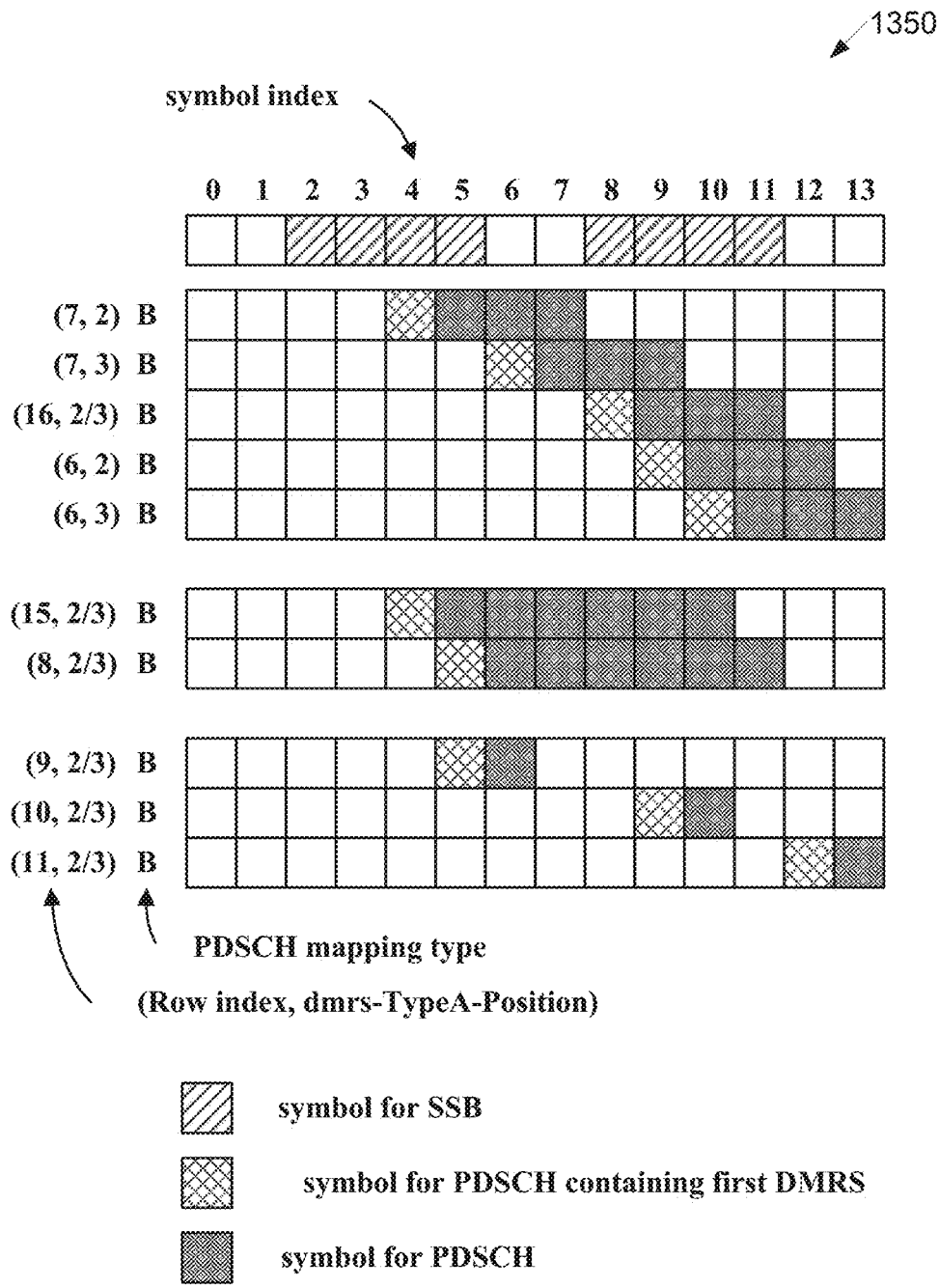
FIG. 13B illustrates an example Type B PDSCH resource mapping according to embodiments of the present disclosure.

FIG. 13B illustrates an example type B PDSCH resource mapping according 1350 to embodiments of the present disclosure. An embodiment of the type B PDSCH resource mapping according 1350 shown in FIG. 13B is for illustration only. FIG. 13B does not limit a scope of the present disclosure.

A summary of supported default PDSCH time domain resource allocation for RMSI is shown in FIGS. 13A and 13B, for PDSCH mapping type as Type A and Type B, respectively.

In one example, the enhanced configuration of PDSCH resource allocation for RMSI, as described in the present disclosure, can replace some of the supported NR standard specification configurations, or partially replace some of the supported NR standard specification configurations by branching on the value of dmrs-TypeA-Position (one value corresponds to NR standard specification configuration, and the other value corresponds to an enhanced configuration as in the present disclosure).

In one example, at least one of the configurations with PDSCH mapping type as "Type A," starting symbol S as "3," and dmrs-TypeA-Position as "3," can be replaced by an enhanced configuration of PDSCH resource allocation for RMSI, as described in this disclosure, because the supported number of symbols for CORESET #0 is only 1 or 2 on the unlicensed band, such that the application scenario with these configurations is limited. For instance, at least one of the configurations include at least one of (Row index, dmrs-TypeA-Position) as (1, 3), (2, 3), (3, 3), (4, 3), or (5, 3).

In one example, the starting symbol of PDSCH (e.g., S) of the at least one of the configurations can be shifted in advance by Δ symbols, and the length of PDSCH (e.g., L) of the at least one of the configurations maintains the same, where Δ can be one of 1, 2, or 3. For instance, the resulting changes to the default PDSCH time domain resource allocation A for normal CP is as in TABLE 11-1 (only showing the changed part, and could be down-selected from the table), where Δ can be one of 1, 2, or 3, for operation with shared spectrum channel access, and is 0 for operation not with shared spectrum channel access.

In another example, the resulting changes can be described as additional limitation to the default PDSCH time domain resource allocation A for normal CP, without changing the content of the table, wherein the limitation is "for operation with shared spectrum channel access, when PDSCH mapping type is provided as "Type A," starting symbol S is provided as "3," and dmrs-TypeA-Position is provided as "3," the starting symbol of PDSCH is determined as 3−Δ," where Δ can be one of 1, 2, or 3. In one further consideration of this aspect, Δ can be chosen independently from {1, 2, 3} for each of the configurations.

TABLE 11-1

Example changes to NR standard specification default PDSCH
time domain resource allocation A for normal CP.

| Row index | dmrs-TypeA-Position | PDSCH mapping type | K_0 | S | L |
|---|---|---|---|---|---|
| 1 | 3 | Type A | 0 | 3 − Δ | 11 |
| 2 | 3 | Type A | 0 | 3 − Δ | 9 |
| 3 | 3 | Type A | 0 | 3 − Δ | 8 |
| 4 | 3 | Type A | 0 | 3 − Δ | 6 |
| 5 | 3 | Type A | 0 | 3 − Δ | 4 |

In another example, the starting symbol of PDSCH (e.g., S) of the at least one of the configurations can be shifted in advance by Δ symbols, and the length of PDSCH (e.g., L) of the at least one of the configurations enlarge by Δ symbols, where Δ can be one of 1, 2, or 3. For instance, the resulting changes to the default PDSCH time domain resource allocation A for normal CP is as in TABLE 11-2 (only showing the changed part, and could be down-selected from the table), where Δ can be one of 1, 2, or 3, for operation with shared spectrum channel access, and is 0 for operation not with shared spectrum channel access.

In one instance, the resulting changes can be described as additional limitation to the default PDSCH time domain resource allocation A for normal CP, without changing the content of the table, wherein the limitation is "for operation with shared spectrum channel access, when PDSCH mapping type is provided as "Type A," starting symbol S is provided as "3," and dmrs-TypeA-Position is provided as "3," the starting symbol of PDSCH is determined as 3−Δ, and the length of the PDSCH is determined as L+Δ," where Δ can be one of 1, 2, or 3. In one further consideration of this aspect, Δ can be chosen independently from {1, 2, 3} for each of the configurations.

TABLE 11-2

Example changes to NR standard specification default PDSCH
time domain resource allocation A for normal CP.

| Index | dmrs-TypeA-Position | PDSCH mapping type | K_0 | S | L |
|---|---|---|---|---|---|
| 1 | 3 | Type A | 0 | 3 − Δ | 11 + Δ |
| 2 | 3 | Type A | 0 | 3 − Δ | 9 + Δ |
| 3 | 3 | Type A | 0 | 3 − Δ | 8 + Δ |
| 4 | 3 | Type A | 0 | 3 − Δ | 6 + Δ |
| 5 | 3 | Type A | 0 | 3 − Δ | 4 + Δ |

In another example, at least one of the configurations with PDSCH mapping type as "Type B," and length of PDSCH L as "2," can be replaced or partially replaced (e.g., by separating the configuration for dmrs-TypeA-Position as "2" or "3") by an enhanced configuration of PDSCH resource allocation for RMSI, as described in this disclosure (e.g., example in TABLE 7-1), because the location of the PDSCH collides with SS/PBCH blocks, such that the application scenario with these configurations is limited. For instance, the at least one of the configurations include at least one of (Row index, dmrs-TypeA-Position) as (9, 2 or 3), (10, 2 or 3), (11, 2 or 3). For one instance, when the UE is configured with Row index as 9 and dmrs-TypeA-Position as 2 or 3, if the operation is without shared spectrum channel access, the UE determines the set of {S, L} as {5, 2}; if the operation if with shared spectrum channel access, the UE determines the set of {S, L} as {6, 7}. An example UE procedure for determining the PDSCH time domain resource allocation for this instance is illustrated in FIG. 14B.

For another instance, when the UE is configured with Row index as 9 and dmrs-TypeA-Position as 2 or 3, if the operation is without shared spectrum channel access, the UE determines the set of {S, L} as {5, 2}; if the operation if with shared spectrum channel access, the UE determines the set of {S, L} as {7, 7}. An example UE procedure for determining the PDSCH time domain resource allocation for this instance is illustrated in FIG. 14B.

For yet another instance, when the UE is configured with Row index as 10 and dmrs-TypeA-Position as 2 or 3, if the operation is without shared spectrum channel access, the UE determines the set of {S, L} as {9, 2}; if the operation if with shared spectrum channel access, the UE determines the set of {S, L} as {6, 7}. An example UE procedure for determining the PDSCH time domain resource allocation for this instance is illustrated in FIG. 14B.

For yet another instance, when the UE is configured with Row index as 10 and dmrs-TypeA-Position as 2 or 3, if the operation is without shared spectrum channel access, the UE determines the set of {S, L} as {9, 2}; if the operation if with shared spectrum channel access, the UE determines the set of {S, L} as {7, 7}. An example UE procedure for determining the PDSCH time domain resource allocation for this instance is illustrated in FIG. 14B.

For yet another instance, when the UE is configured with Row index as 11 and dmrs-TypeA-Position as 2 or 3, if the operation is without shared spectrum channel access, the UE determines the set of {S, L} as {12, 2}; if the operation if with shared spectrum channel access, the UE determines the set of {S, L} as {6, 7}. An example UE procedure for determining the PDSCH time domain resource allocation for this instance is illustrated in FIG. 14B.

For yet another instance, when the UE is configured with Row index as 11 and dmrs-TypeA-Position as 2 or 3, if the operation is without shared spectrum channel access, the UE determines the set of {S, L} as {12, 2}; if the operation if with shared spectrum channel access, the UE determines the set of {S, L} as {7, 7}. An example UE procedure for determining the PDSCH time domain resource allocation for this instance is illustrated in FIG. 14B.

In one example, the starting symbol of PDSCH (e.g., S) of the at least one of the configurations can be shifted in advance by Δ symbols, and the length of PDSCH (e.g., L) of the at least one of the configurations maintains the same, where Δ can be one of 1, 2, or 3. For instance, the resulting changes to the default PDSCH time domain resource allocation A for normal CP is as in TABLE 11-3 (only showing the changed part, and could be down-selected from the table), where Δ can be one of 1, 2, or 3, for operation with shared spectrum channel access, and is 0 for operation not with shared spectrum channel access.

In one instance, the resulting changes can be described as additional limitation to the default PDSCH time domain resource allocation A for normal CP, without changing the content of the table, wherein the limitation is "for operation with shared spectrum channel access, when PDSCH mapping type is provided as "Type B," and length of PDSCH L is provided as "2," the starting symbol of PDSCH is determined as S−Δ," where Δ can be one of 1, 2, or 3. In one further consideration of this aspect, Δ can be chosen independently from {1, 2, 3} for each of the configurations.

TABLE 11-3

Example changes to NR standard specification default PDSCH time domain resource allocation A for normal CP.

| Index | dmrs-TypeA-Position | PDSCH mapping type | K_0 | S | L |
|---|---|---|---|---|---|
| 9 | 2, 3 | Type B | 0 | 5 − Δ | 2 |
| 10 | 2, 3 | Type B | 0 | 9 − Δ | 2 |
| 11 | 2, 3 | Type B | 0 | 12 − Δ | 2 |

In another aspect of this example, for one of the configured value of dmrs-TypeA-Position (e.g., "2" or "3"), the starting symbol of PDSCH (e.g., S) of the at least one of the configurations can be shifted in advance by Δ symbols, and the length of PDSCH (e.g., L) of the at least one of the configurations maintains the same, where Δ can be one of 1, 2, or 3; and for the other of the configured value of dmrs-TypeA-Position, the starting symbol and length of PDSCH maintain the same. For instance, the resulting changes to the default PDSCH time domain resource allocation A for normal CP is as in TABLE 11-1. -4 (only showing the changed part, and could be down-selected from the table), where Δ can be one of 1, 2, or 3, for operation with shared spectrum channel access, and is 0 for operation not with shared spectrum channel access.

In another instance, the resulting changes can be described as additional limitation to the default PDSCH time domain resource allocation A for normal CP, without changing the content of the table, wherein the limitation is "for operation with shared spectrum channel access, when PDSCH mapping type is provided as "Type B," dmrs-TypeA-Position is provided as "3" (or "2"), and length of PDSCH L is provided as "2," the starting symbol of PDSCH is determined as S−Δ," where Δ can be one of 1, 2, or 3. In one further consideration of this aspect, Δ can be chosen independently from {1, 2, 3} for each of the configurations.

TABLE 11-4

Example changes to NR standard specification default PDSCH time domain resource allocation A for normal CP.

| Index | dmrs-TypeA-Position | PDSCH mapping type | K_0 | S | L |
|---|---|---|---|---|---|
| 9 | 2 | Type B | 0 | 5 | 2 |
|   | 3 | Type B | 0 | 5 − Δ | 2 |
| 10 | 2 | Type B | 0 | 9 | 2 |
|   | 3 | Type B | 0 | 5 − Δ | 2 |
| 11 | 2 | Type B | 0 | 12 | 2 |
|   | 3 | Type B | 0 | 5 − Δ | 2 |

In yet another example, at least one of the configurations with PDSCH mapping type as "Type B," and length of PDSCH L as "4," can be replaced or partially replaced (e.g., by separating the configuration for dmrs-TypeA-Position as "2" or "3") by an enhanced configuration of PDSCH resource allocation for RMSI, as described in this disclosure, because the location of the PDSCH collides with SS/PBCH blocks, such that the application scenario with these configurations is limited.

In yet another example, at least one of the configurations with PDSCH mapping type as "Type B," and length of PDSCH L as "7," can be replaced or partially replaced (e.g., by separating the configuration for dmrs-TypeA-Position as "2" or "3") by an enhanced configuration of PDSCH resource allocation for RMSI, as described in this disclosure, because the location of the PDSCH collides with SS/PBCH blocks, such that the application scenario with these configurations is limited. For instance, at least one of the configurations include at least one of (Row index, dmrs-TypeA-Position) as (8, 2 or 3), or (15, 2 or 3).

In one example, the starting symbol of PDSCH (e.g., S) of the at least one of the configurations can be shifted to a later time instance by Δ symbols, and the length of PDSCH (e.g., L) of the at least one of the configurations maintains the same, where Δ is 2. For instance, the resulting changes to the default PDSCH time domain resource allocation A for normal CP is as in TABLE 11-5 (only showing the changed part, and could be down-selected from the table), where Δ is 2 for operation with shared spectrum channel access, and is 0 for operation not with shared spectrum channel access.

In another instance, the resulting changes can be described as additional limitation to the default PDSCH time domain resource allocation A for normal CP, without changing the content of the table, wherein the limitation is "for operation with shared spectrum channel access, when PDSCH mapping type is provided as "Type B," and length of PDSCH L is provided as "7," the starting symbol of PDSCH is determined as S+2, where S is provided in the table."

TABLE 11-5

Example changes to NR standard specification default PDSCH time domain resource allocation A for normal CP.

| Index | dmrs-TypeA-Position | PDSCH mapping type | K_0 | S | L |
|---|---|---|---|---|---|
| 8 | 2, 3 | Type B | 0 | 5 + Δ | 7 |
| 15 | 2, 3 | Type B | 0 | 4 + Δ | 7 |

In another example, for one of the configured value of dmrs-TypeA-Position (e.g., "2" or "3"), the starting symbol of PDSCH (e.g., S) of the at least one of the configurations can be shifted to a later time instance by Δ symbols, and the length of PDSCH (e.g., L) of the at least one of the configurations maintains the same, where Δ can be 2; and for the other of the configured value of dmrs-TypeA-Position, the starting symbol and length of PDSCH maintain the same. For instance, the resulting changes to the default PDSCH time domain resource allocation A for normal CP is as in TABLE 11-6 (only showing the changed part, and could be down-selected from the table), where Δ is 2 for operation with shared spectrum channel access, and is 0 for operation not with shared spectrum channel access.

In another instance, the resulting changes can be described as additional limitation to the default PDSCH time domain resource allocation A for normal CP, without changing the content of the table, wherein the limitation is "when PDSCH mapping type is provided as "Type B," dmrs-TypeA-Position is provided as "3" (or "2"), and length of PDSCH L is provided as "7," the starting symbol of PDSCH is determined as S+2, where S is provided in the table."

TABLE 11-6

Example changes to NR standard specification default PDSCH time domain resource allocation A for normal CP.

| Index | dmrs-TypeA-Position | PDSCH mapping type | K_0 | S | L |
|---|---|---|---|---|---|
| 8 | 2 | Type B | 0 | 5 | 7 |
|   | 3 | Type B | 0 | 5 + Δ | 7 |
| 15 | 2 | Type B | 0 | 4 | 7 |
|   | 3 | Type B | 0 | 4 + Δ | 7 |

Figure 14A:
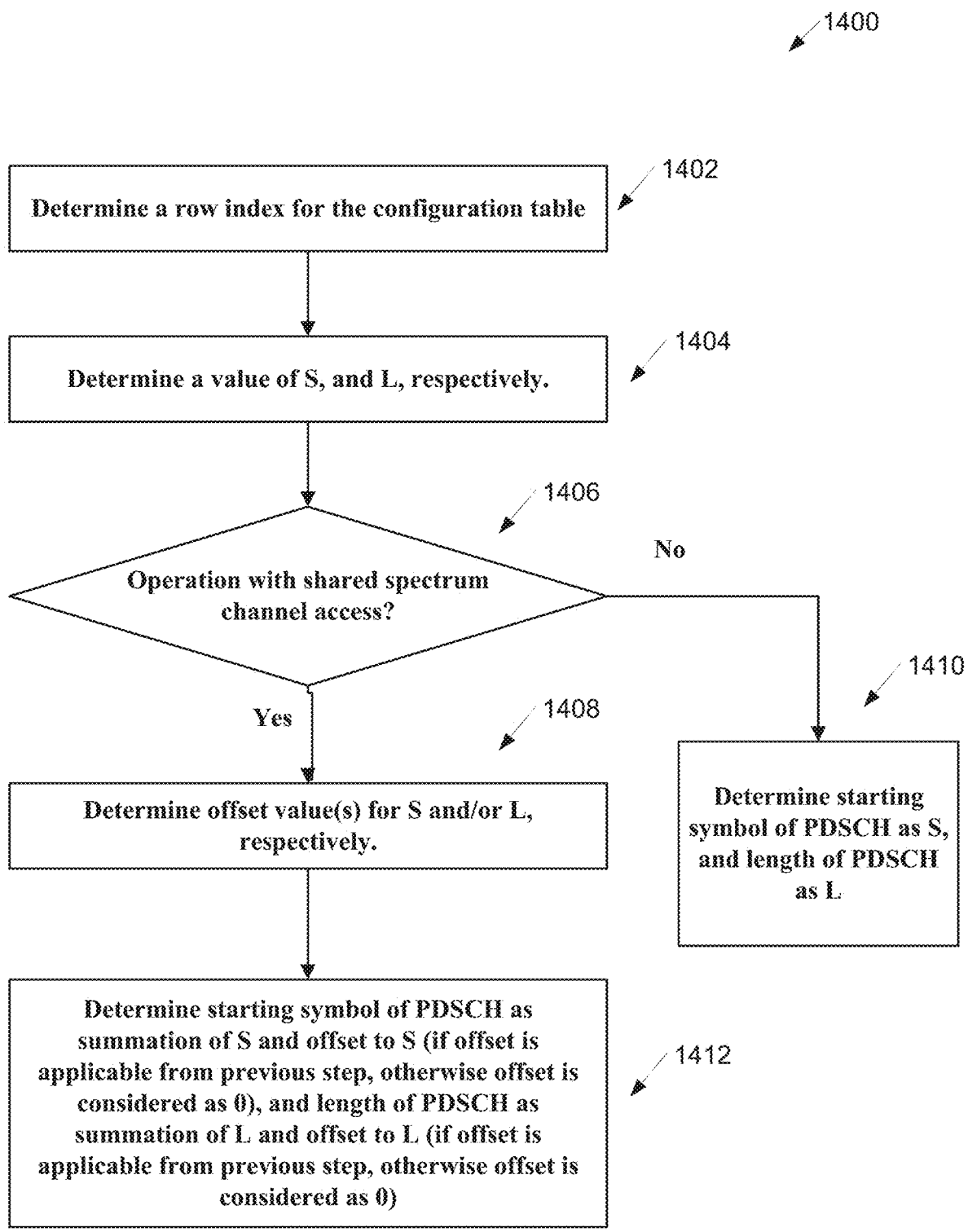
FIG. 14A illustrates a flow chart of a method for determining the PDSCH time domain resource allocation according to embodiments of the present disclosure.
Figure 14B:
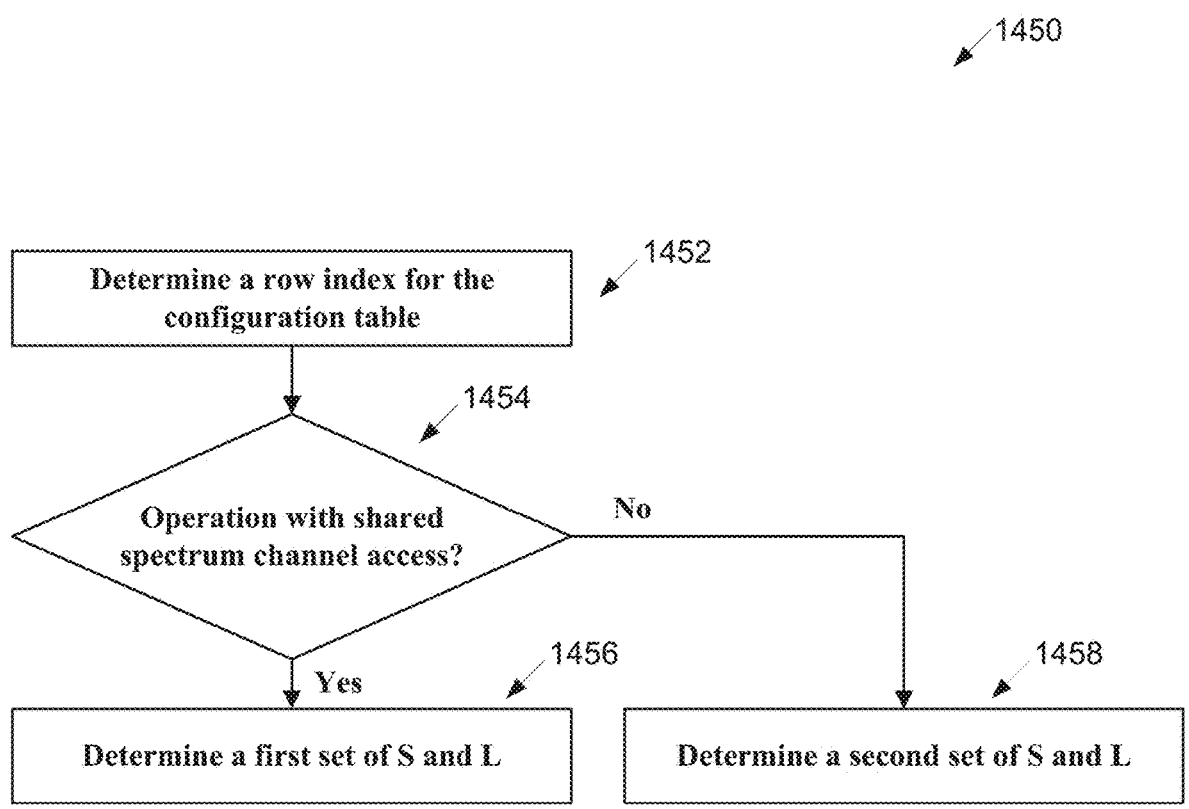
FIG. 14B illustrates another flow chart of a method for determining the PDSCH time domain resource allocation according to embodiments of the present disclosure.

An example UE procedure for determining the PDSCH time domain resource allocation, according to example in this disclosure, is illustrated in FIG. 14A.

FIG. 14A illustrates a flow chart of a method 1400 for determining the PDSCH time domain resource allocation according to embodiments of the present disclosure, as may be performed by a user equipment (UE) (e.g., 111-116 as illustrated in FIG. 1). An embodiment of the method 1400 shown in FIG. 14A is for illustration only. FIG. 14A does not limit a scope of the present disclosure.

As illustrated in FIG. 14A, a UE determines a row index for the configuration table in step 1402. In step 1404, the UE determines a value of S and L, respectively. In step 1406, the UE determines whether an operation with shared spectrum channel access is achieved. In step 1406, the operation is achieved, the UE determines in step 1408 offset value(s) for S and/or L, respectively. The UE in step 1412 determines a starting symbol of PDSCH as a summation of S and offset to S (if offset is applicable from previous step, otherwise offset is considered as 0), and a length of PDSCH as a summation of L and offset to L (if offset is applicable from previous step, otherwise offset is considered as 0). In step 1406, if the operation with shared spectrum channel access is not achieved, the UE in step 1410 determines a starting symbol of PDSCH as S, and a length of PDSCH as L.

Another example UE procedure for determining the PDSCH time domain resource allocation, according to example in this disclosure, is illustrated in FIG. 14B.

FIG. 14B illustrates another flow chart of a method 1450 for determining the PDSCH time domain resource allocation according to embodiments of the present disclosure, as may be performed by a user equipment (UE) (e.g., 111-116 as illustrated in FIG. 1). An embodiment of the method 1450 shown in FIG. 14B is for illustration only. FIG. 14B does not limit a scope of the present disclosure.

As illustrated in FIG. 14B, the method 1450 begins at step 1452. In step 1452, the method 1450 determines a row index for the configuration table. Subsequently, in step 1454, the method 1450 determines whether the operation with shared spectrum channel access is performed. In step 1454, if the operation with shared spectrum channel access is performed, the method 1450 determines a first set of S and L in step 1456. In step 1454, if the operation with shared spectrum channel access is not performed, the method 1450 determines a second set of S and L in step 1458.

Figure 15:
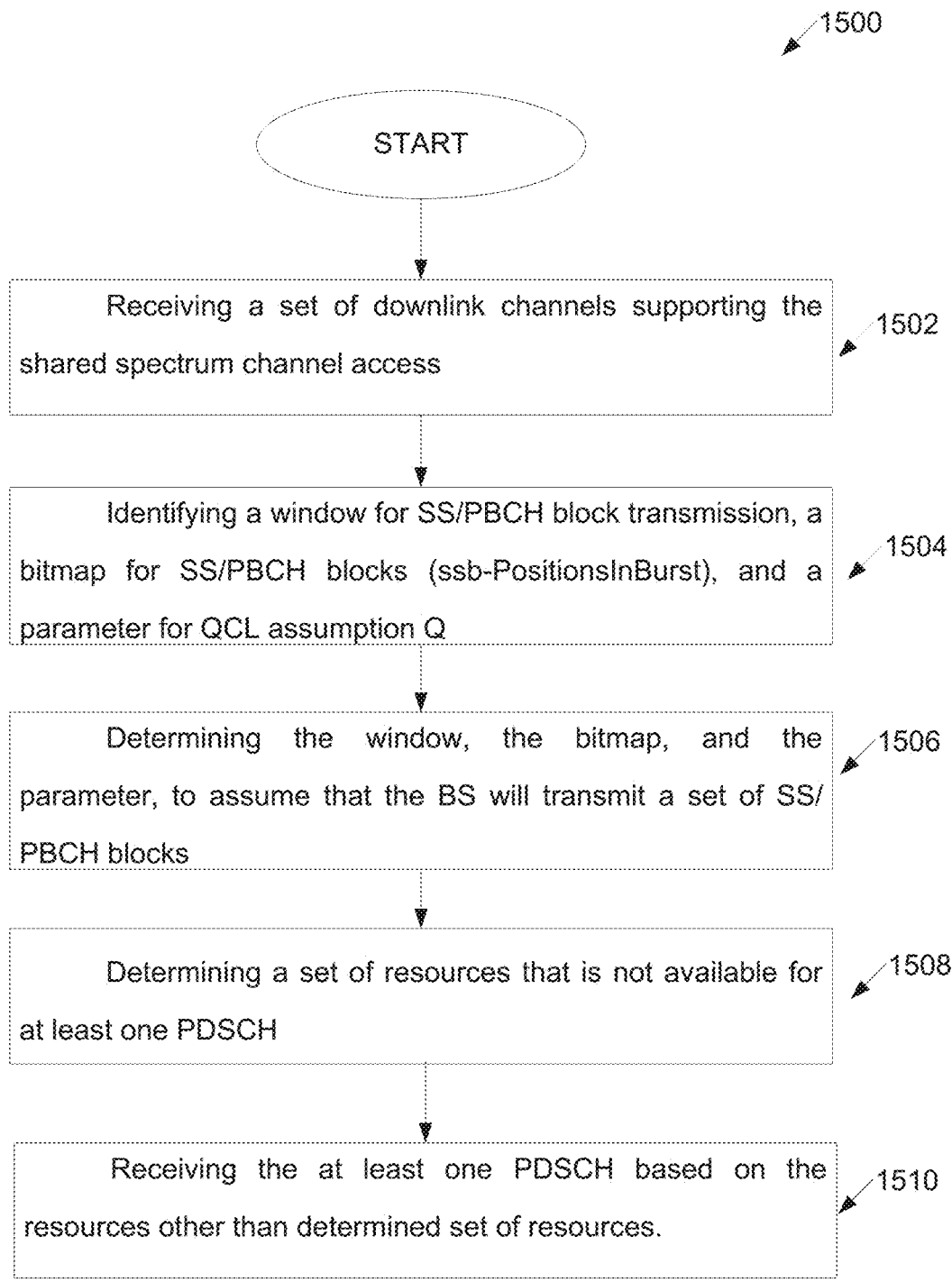
FIG. 15 illustrates a flow chart of a method for resource mapping of PDSCH according to embodiments of the present disclosure.

FIG. 15 illustrates a flow chart of a method 1500 for resource mapping of PDSCH according to embodiments of the present disclosure, as may be performed by a user equipment (UE) (e.g., 111-116 as illustrated in FIG. 1). An embodiment of the method 1500 shown in FIG. 15 is for illustration only. FIG. 15 does not limit a scope of the present disclosure.

As illustrated in FIG. 15, the method 1500 begins at step 1502. In step 1502, a UE receives, from a base station (BS), a set of downlink channels supporting the shared spectrum channel access.

Subsequently, in step 1504, the UE identifies, from the set of downlink channels, a window for synchronization signal/physical broadcast channel (SS/PBCH) block transmission, a bitmap for SS/PBCH blocks (ssb-PositionsInBurst), and a parameter for quasi-co-location (QCL) assumption Q.

Subsequently, in step 1506, the UE determines, based on the identified window for the SS/PBCH block transmission, the identified bitmap for the ssb-PositionsInBurst, and the identified parameter for the QCL assumption Q, a SS/PBCH block in the identified window for the SS/PBCH block transmission as one of: a first set of SS/PBCH blocks assumed to be transmitted by the BS, or a second set of SS/PBCH blocks not transmitted by the BS.

In one embodiment, the SS/PBCH block in the window for the SS/PBCH block transmission, with an index given by i+n·Q, wherein 0≤i≤Q−1 and n is a non-negative integer, is determined as one of: in the first set of SS/PBCH blocks, if a (i+1)th bit in the ssb-PositionsInBurst is identified as one; or in the second set of SS/PBCH blocks, if the (i+1)th bit in the ssb-PositionsInBurst is identified as zero.

Next, in step 1508, the UE determines a set of resources that is not available for at least one physical downlink shared channel (PDSCH) as overlapped with the first set of SS/PBCH blocks.

In one embodiment, the at least one PDSCH does not carry remaining minimum system information (RMSI).

Finally, in step 1510, the UE receives, from the BS, the at least one PDSCH based on resources other than the determined set of resources.

In one embodiment, the UE identifies a (i+1)th bit in the ssb-PositionsInBurst as a value of zero, if i≥Q.

In one embodiment, the UE determines a number of transmitted SS/PBCH blocks in the identified window for the SS/PBCH block transmission as a number of bits with value one in the ssb-PositionsInBurst.

In one embodiment, the UE determines a default time domain resource allocation including a starting symbol S and a length of symbol L for the at least one PDSCH. In such embodiment, the starting symbol S and the length of symbol L comprise a first set of values if the at least one PDSCH is operated with the shared spectrum channel access, the first set of values being determined as {S, L}={6, 7} and a second set of values if the at least one PDSCH is operated without the shared spectrum channel access, the second set of values being determined as {S, L}={5, 2}.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) in a wireless communication system supporting shared spectrum channel access, the UE comprising:

at least one transceiver configured to receive, from a base station (BS), a set of downlink channels supporting the shared spectrum channel access; and at least one processor operably connected to the at least one transceiver, the at least one processor configured to:

identify, from the set of downlink channels, a window for synchronization signal/physical broadcast channel (SS/PBCH) block transmission, a bitmap for SS/PBCH blocks (ssb-PositionsInBurst), and a parameter for quasi-co-location (QCL) assumption Q, determine, based on the identified window for the SS/PBCH block transmission, the identified bitmap for the ssb-PositionsInBurst, and the identified parameter for the QCL assumption Q, a SS/PBCH block in the identified window for the SS/PBCH block transmission as one of:
a first set of SS/PBCH blocks assumed to be transmitted by the BS, or
a second set of SS/PBCH blocks not transmitted by the BS, and
determine a set of resources that is not available for at least one physical downlink shared channel (PDSCH) as overlapped with the first set of SS/PBCH blocks,
wherein the at least one transceiver is further configured to receive, from the BS, the at least one PDSCH based on resources other than the determined set of resources.

2. The UE of claim 1, wherein the SS/PBCH block in the window for the SS/PBCH block transmission, with an index given by i+n·Q, wherein 0≤i≤Q−1 and n is a non-negative integer, is determined as one of:
in the first set of SS/PBCH blocks, if a (i+1)th bit in the ssb-PositionsInBurst is identified as one, or
in the second set of SS/PBCH blocks, if the (i+1)th bit in the ssb-PositionsInBurst is identified as zero.

3. The UE of claim 1, wherein the at least one processor is further configured to identify a (i+1)th bit in the ssb-PositionsInBurst as a value of zero, if i≥Q.

4. The UE of claim 1, wherein the at least one processor is further configured to determine a number of transmitted SS/PBCH blocks in the identified window for the SS/PBCH block transmission as a number of bits with value one in the ssb-PositionsInBurst.

5. The UE of claim 1, wherein the at least one PDSCH does not carry remaining minimum system information (RMSI).

6. The UE of claim 1, wherein the at least one processor is further configured to determine a default time domain resource allocation including a starting symbol S and a length of symbol L for the at least one PDSCH, and
wherein, the starting symbol S and the length of symbol L comprise:
a first set of values if the at least one PDSCH is operated with the shared spectrum channel access, and
a second set of values if the at least one PDSCH is operated without the shared spectrum channel access.

7. The UE of claim 6, wherein:
the first set of values is determined as {S, L}={6, 7}, and
the second set of values is determined as {S, L}={5, 2}.

8. A base station (BS) in a wireless communication system supporting shared spectrum channel access, the BS comprising:
at least one processor configured to determine a window for synchronize signal/physical broadcast channel (SS/PBCH) block transmission, a bitmap for SS/PBCH blocks (ssb-PositionsInBurst), and a parameter for quasi-co-location (QCL) assumption Q; and
at least one transceiver operably connected to the at least one processor, the at least one transceiver configured to transmit, to a user equipment (UE), a set of downlink channels including the window for the SS/PBCH block transmission, the bitmap for ssb-PositionsInBurst, and the parameter for QCL assumption Q,
wherein the at least one processor is further configured to:
indicate, to the UE, a SS/PBCH block, based on the window for the SS/PBCH block transmission, the bitmap for ssb-PositionsInBurst, and the parameter for QCL assumption Q, the SS/PBCH block that is identified in the window for the SS/PBCH block transmission being determined, at the UE, as one of:
a first set of SS/PBCH blocks assumed to be transmitted by the BS, or
a second set of SS/PBCH blocks assumed to be transmitted by the BS, and
determine a set of resources that is not available for at least one physical downlink shared channel (PDSCH) as overlapped with the first set of SS/PBCH blocks, and
wherein the at least one transceiver is further configured to transmit, to the UE, the at least one PDSCH using other resources than the determined set of resources.

9. The BS of claim 8, wherein the SS/PBCH block in the window for the SS/PBCH block transmission, with an index given by i+n·Q, wherein 0≤i≤Q−1 and n is a non-negative integer, is determined as one of:
in the first set of SS/PBCH blocks, if a (i+1)th bit in the ssb-PositionsInBurst is identified as one, or
in the second set of SS/PBCH blocks, if the (i+1)th bit in the ssb-PositionsInBurst is identified as zero.

10. The BS of claim 8, wherein the at least one processor is further configured to set a (i+1)th bit in the ssb-PositionsInBurst as a value of zero, if i≥Q.

11. The BS of claim 8, wherein the at least one processor is further configured to set a number of transmitted SS/PBCH blocks in the identified window for the SS/PBCH block transmission as a number of bits with value one in the ssb-PositionsInBurst.

12. The BS of claim 8, wherein the at least one PDSCH does not carry remaining minimum system information (RMSI).

13. The BS of claim 8, wherein the at least one processor is further configured to determine a default time domain resource allocation including a starting symbol S and a length of symbol L for the at least one PDSCH, and
wherein, the starting symbol S and the length of symbol L comprise:
a first set of values if the at least one PDSCH is operated with the shared spectrum channel access, and
a second set of values if the at least one PDSCH is operated without the shared spectrum channel access.

14. The BS of claim 13, wherein:
the first set of values is determined as {S, L}={6, 7}, and
the second set of values is determined as {S, L}={5, 2}.

15. A method of a user equipment (UE) in a wireless communication system supporting shared spectrum channel access, the method comprising:
receiving, from a base station (BS), a set of downlink channels supporting the shared spectrum channel access;
identifying, from the set of downlink channels, a window for synchronization signal/physical broadcast channel (SS/PBCH) block transmission, a bitmap for SS/PBCH blocks (ssb-PositionsInBurst), and a parameter for quasi-co-location (QCL) assumption Q;
determining, based on the identified window for the SS/PBCH block transmission, the identified bitmap for the ssb-PositionsInBurst, and the identified parameter for the QCL assumption Q, a SS/PBCH block in the identified window for the SS/PBCH block transmission as one of:
a first set of SS/PBCH blocks assumed to be transmitted by the BS, or a second set of SS/PBCH blocks not transmitted by the BS;
determining a set of resources that is not available for at least one physical downlink shared channel (PDSCH) as overlapped with the first set of SS/PBCH blocks; and
receiving, from the BS, the at least one PDSCH based on resource other than the determined set of resources.

16. The method of claim 15, wherein the SS/PBCH block in the window for the SS/PBCH block transmission, with an index given by i+n·Q, wherein 0≤i≤Q−1 and n is a non-negative integer, is determined as one of:
in the first set of SS/PBCH blocks, if a (i+1)th bit in the ssb-PositionsInBurst is identified as one, or
in the second set of SS/PBCH blocks, if the (i+1)th bit in the ssb-PositionsInBurst is identified as zero.

17. The method of claim 15, further comprising identifying a (i+1)th bit in the ssb-PositionsInBurst as a value of zero, if i≥Q.

18. The method of claim 15, further comprising determining a number of transmitted SS/PBCH blocks in the identified window for the SS/PBCH block transmission as a number of bits with value one in the ssb-PositionsInBurst.

19. The method of claim 15, wherein the at least one PDSCH does not carry remaining minimum system information (RMSI).

20. The method of claim 15, further comprising determining a default time domain resource allocation including a starting symbol S and a length of symbol L for the at least one PDSCH,
wherein, the starting symbol S and the length of symbol L comprise:
a first set of values if the at least one PDSCH is operated with the shared spectrum channel access, the first set of values being determined as {S, L}={6, 7}, and
a second set of values if the at least one PDSCH is operated without the shared spectrum channel access, the second set of values being determined as {S, L}={5, 2}.

* * * * *